United States Patent
Oka

(10) Patent No.: US 10,349,026 B2
(45) Date of Patent: Jul. 9, 2019

(54) PROJECTOR, METHOD FOR CONTROLLING THE SAME, AND PROJECTION SYSTEM

(71) Applicant: CANON KABUSHIKI KAISHA, Tokyo (JP)

(72) Inventor: Azusa Oka, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/145,558

(22) Filed: Sep. 28, 2018

(65) Prior Publication Data
US 2019/0104292 A1    Apr. 4, 2019

(30) Foreign Application Priority Data

Oct. 4, 2017 (JP) ................. 2017-194561

(51) Int. Cl.
*H04N 9/31* (2006.01)

(52) U.S. Cl.
CPC ........... *H04N 9/3188* (2013.01); *H04N 9/312* (2013.01); *H04N 9/3138* (2013.01); *H04N 9/3147* (2013.01); *H04N 9/3185* (2013.01)

(58) Field of Classification Search
CPC .... H04N 9/3147; H04N 9/3188; H04N 9/312; H04N 9/3185; H04N 9/31; H04N 9/3179; H04N 9/3138

USPC ........... 348/744–747, 806, 807; 353/30, 34; 345/9

See application file for complete search history.

(56) References Cited

U.S. PATENT DOCUMENTS

| 7,724,205 B2 * | 5/2010 | Inazumi | H04N 9/3147 345/9 |
| 2014/0104582 A1 * | 4/2014 | Mori | H04N 9/3185 353/30 |

FOREIGN PATENT DOCUMENTS

JP    2017027024 A    2/2017

\* cited by examiner

*Primary Examiner* — Sherrie Hsia
(74) *Attorney, Agent, or Firm* — Rossi, Kimms & McDowell LLP

(57) ABSTRACT

A projector, a method for controlling the same, and a projection system which can improve the resolution more efficiently by pixel shifting are disclosed. The projector controls the degree of modulation in a plurality of optical modulation devices and generates a plurality of optical images. To the plurality of optical images, the projector applies first pixel shifting according to the period and second pixel shifting regardless of the period, and projects a resulting image. The first pixel shifting and the second pixel shifting are different from each other, either in the amount of pixel shifting or the direction of pixel shifting.

19 Claims, 22 Drawing Sheets

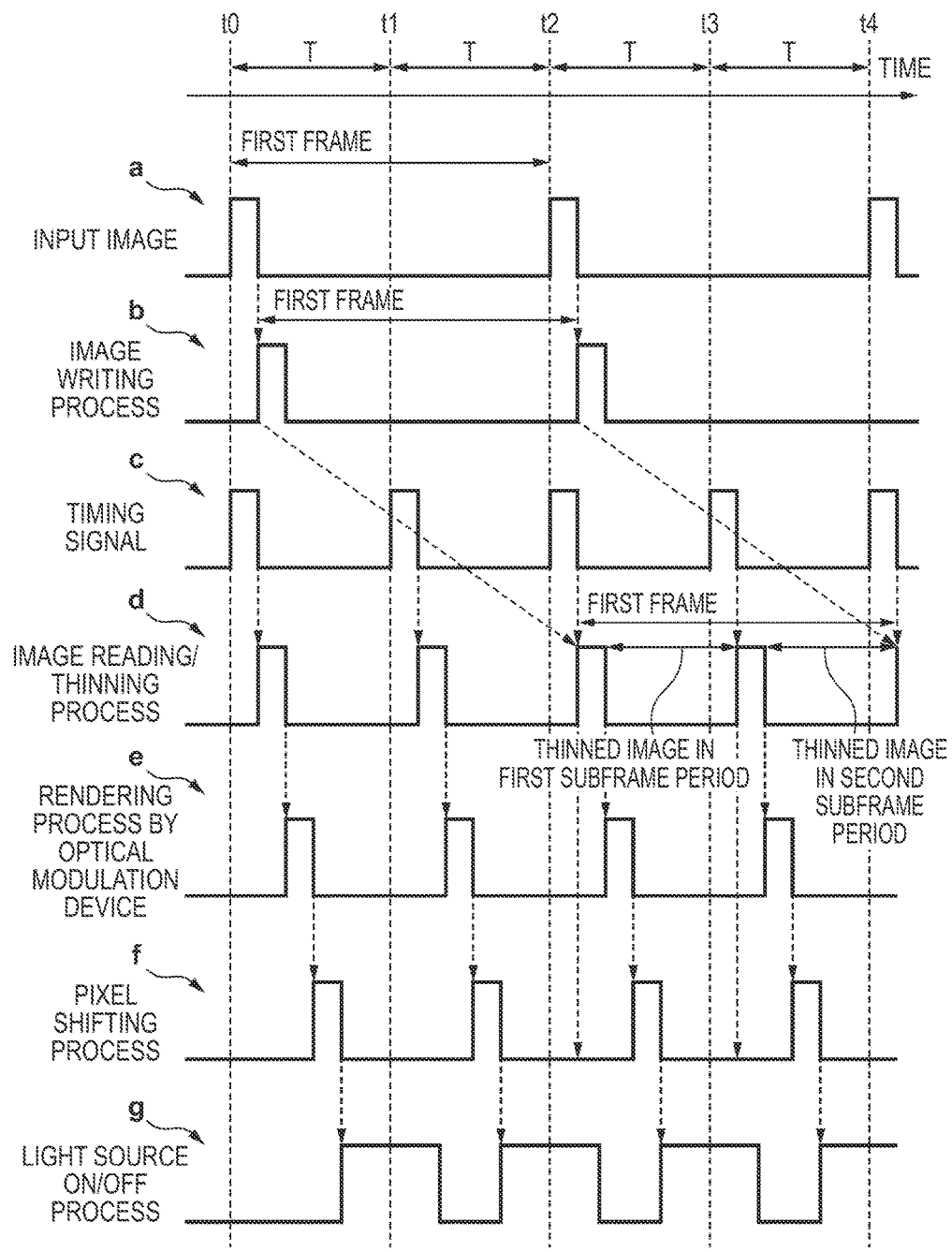

OPTICAL SYSTEM A
FIRST SUBFRAME PERIOD

OPTICAL SYSTEM A
SECOND SUBFRAME PERIOD

OPTICAL SYSTEM B
FIRST SUBFRAME PERIOD

OPTICAL SYSTEM B
SECOND SUBFRAME PERIOD

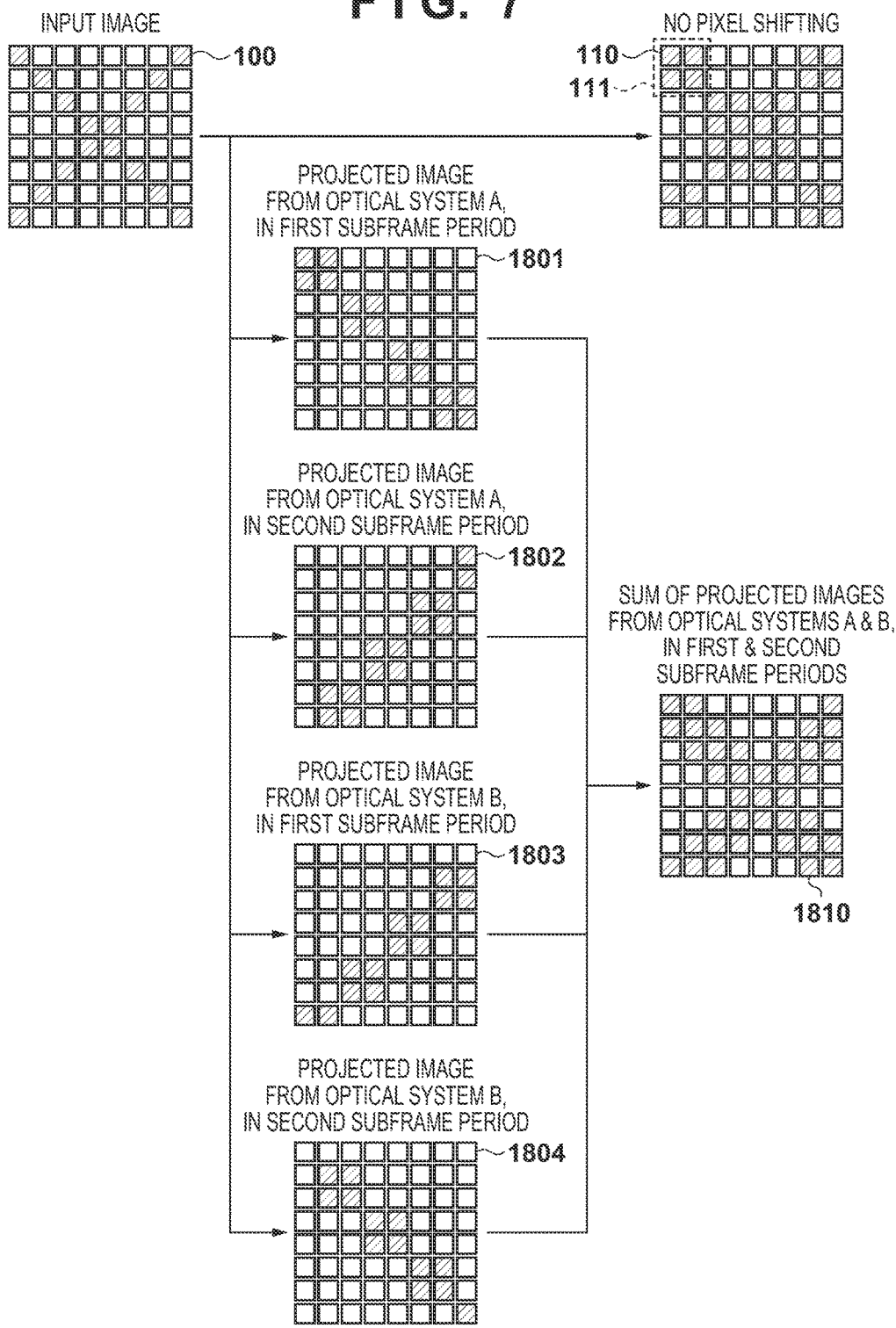

OPTICAL SYSTEM A
FIRST SUBFRAME PERIOD

OPTICAL SYSTEM A
SECOND SUBFRAME PERIOD

OPTICAL SYSTEM B
FIRST SUBFRAME PERIOD

OPTICAL SYSTEM B
SECOND SUBFRAME PERIOD

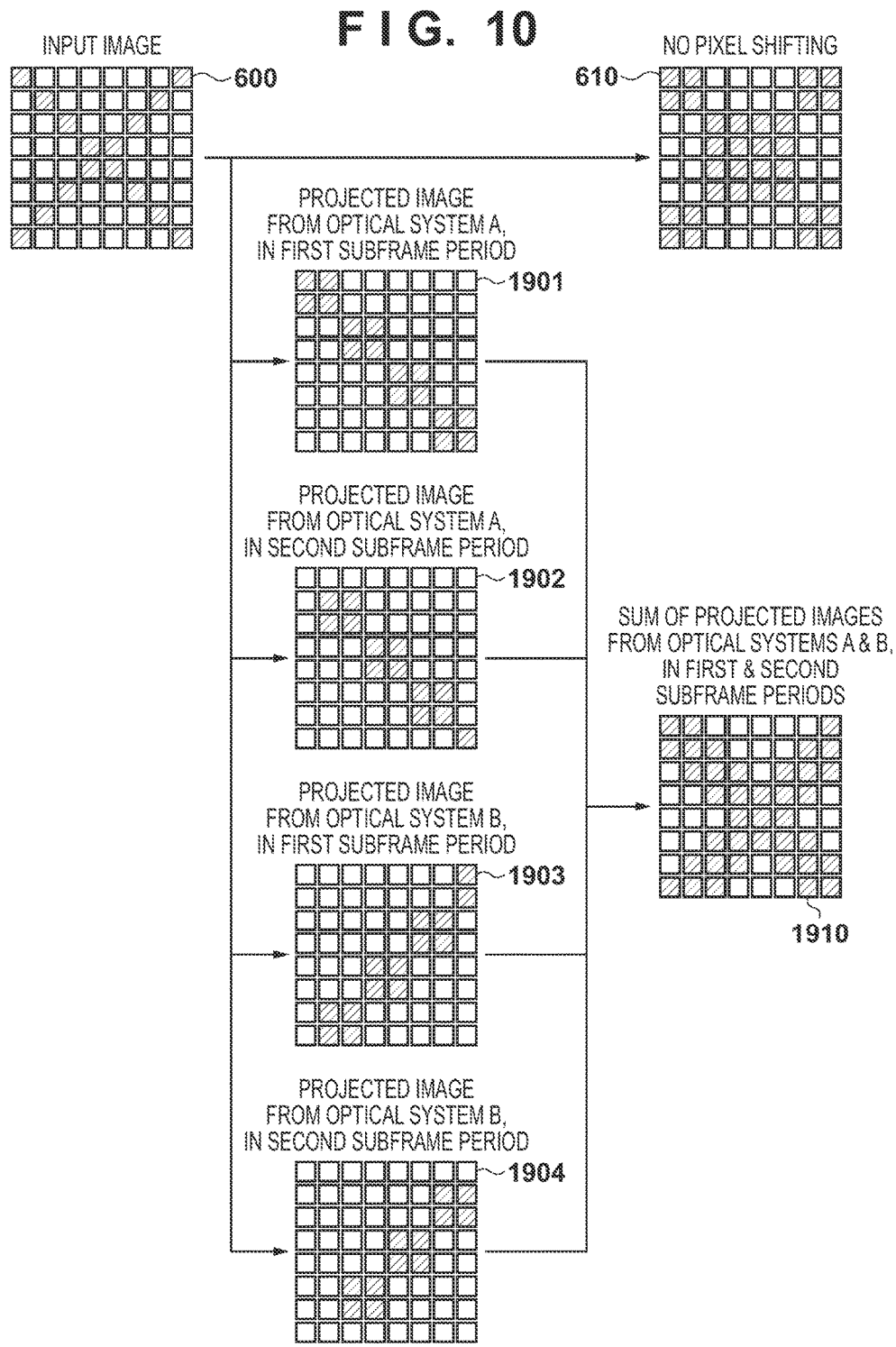

FIG. 11A
OPTICAL SYSTEM A
FIRST SUBFRAME PERIOD
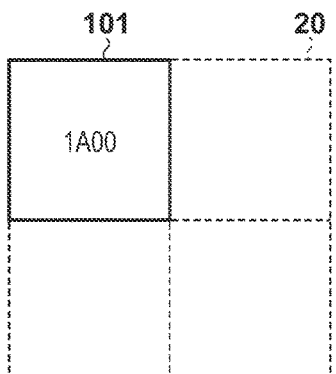
FIG. 11B
OPTICAL SYSTEM A
SECOND SUBFRAME PERIOD
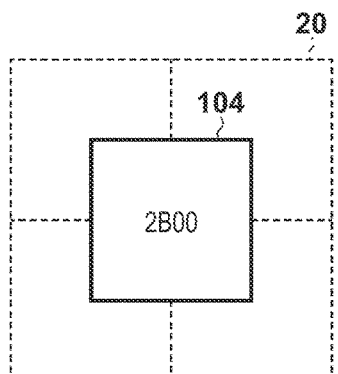
1/2 PIXEL SHIFTING (DIAGONALLY DOWNWARD) →
1/2 PIXEL SHIFTING (VERTICALLY DOWNWARD) ↓
1/2 PIXEL SHIFTING (VERTICALLY DOWNWARD) ↓
OPTICAL SYSTEM B
FIRST SUBFRAME PERIOD
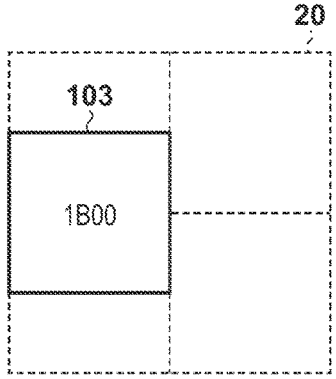
OPTICAL SYSTEM B
SECOND SUBFRAME PERIOD
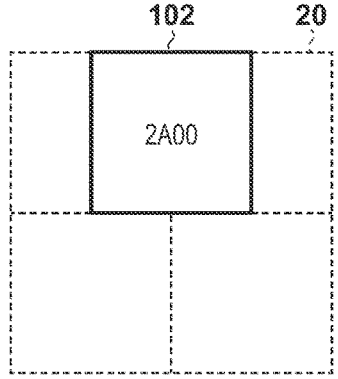
1/2 PIXEL SHIFTING (DIAGONALLY UPWARD) →
FIG. 11C
FIG. 11D

OPTICAL SYSTEM A
FIRST SUBFRAME PERIOD

OPTICAL SYSTEM A
SECOND SUBFRAME PERIOD

OPTICAL SYSTEM B
FIRST SUBFRAME PERIOD

OPTICAL SYSTEM B
SECOND SUBFRAME PERIOD

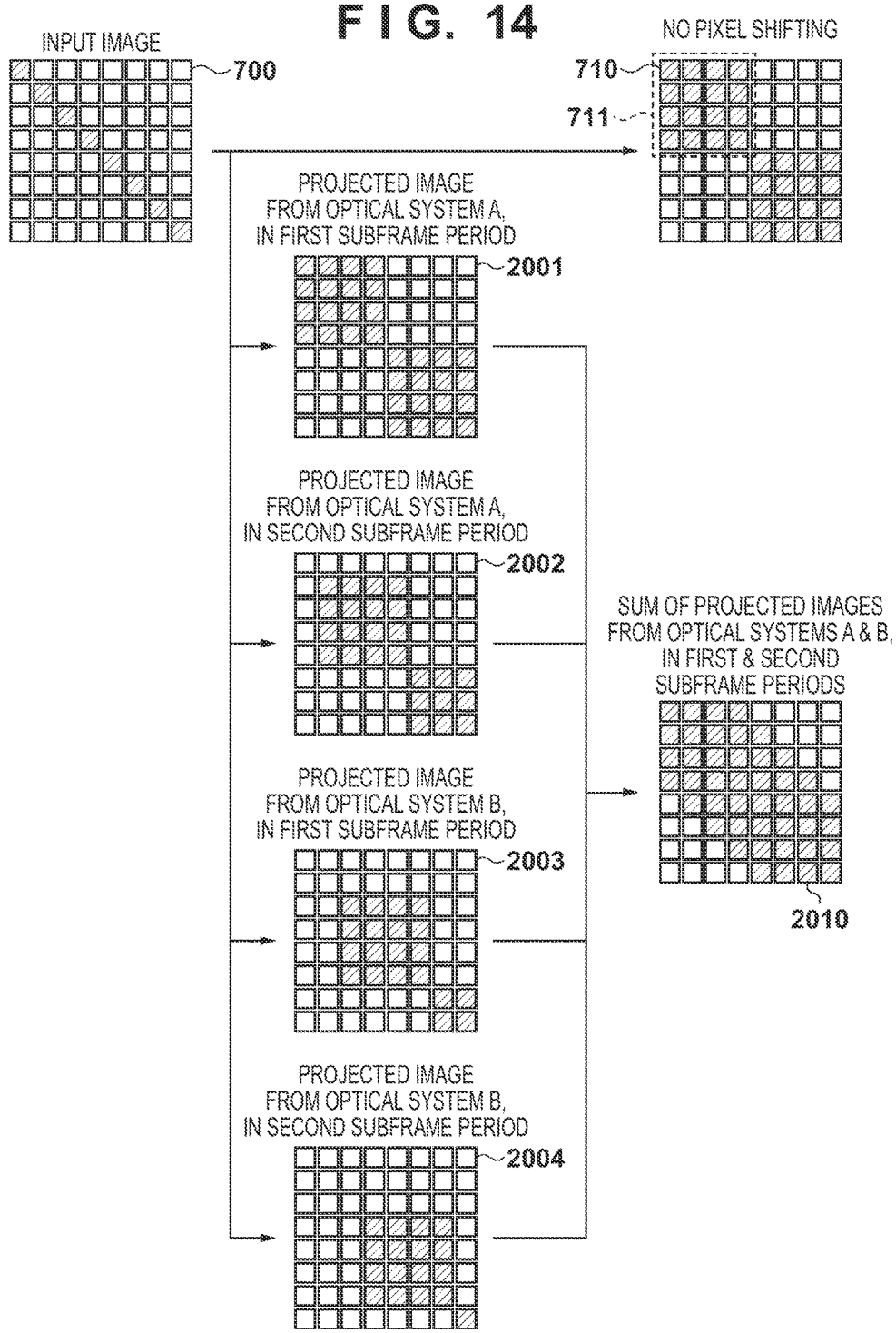

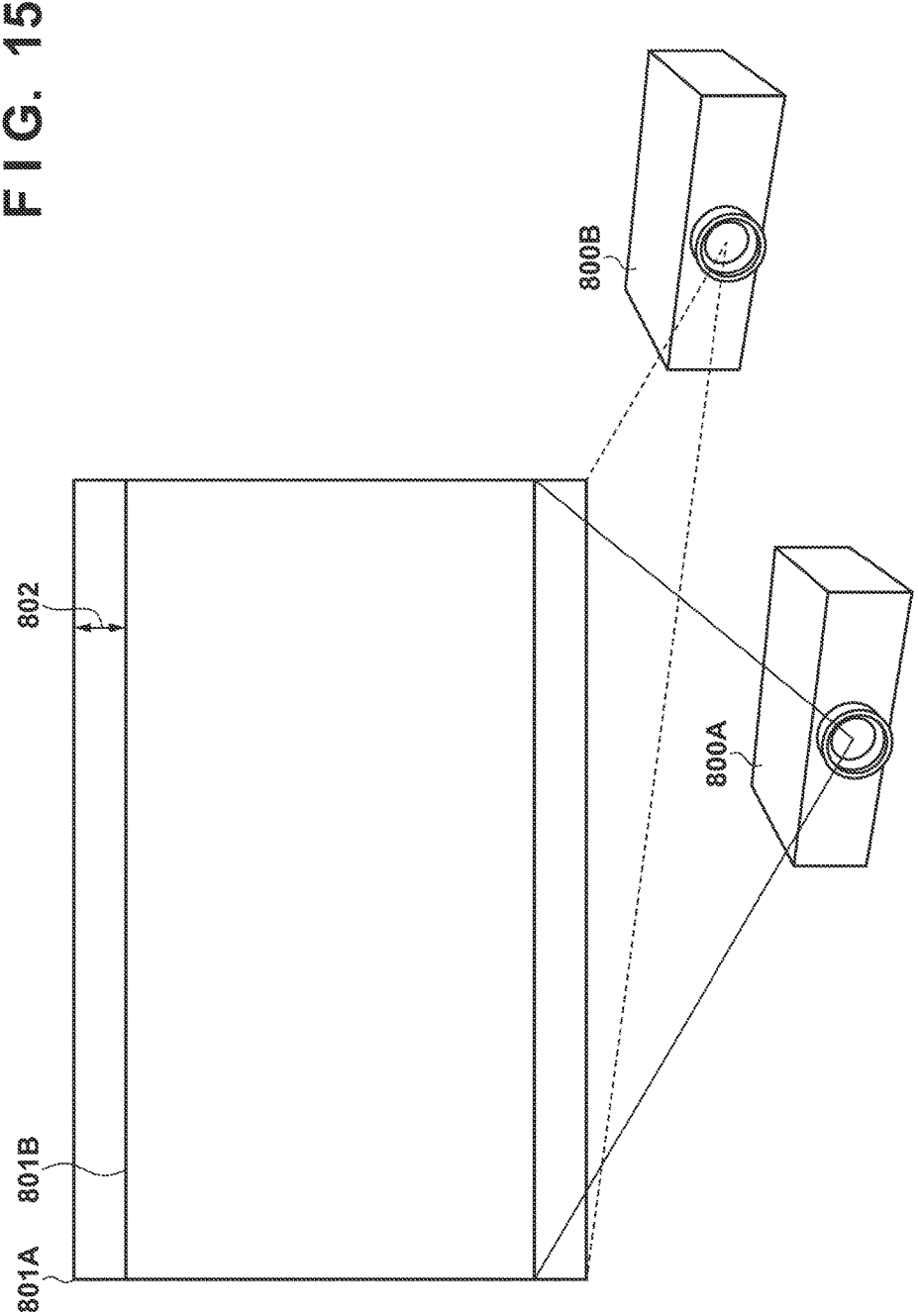

PROJECTOR, METHOD FOR CONTROLLING THE SAME, AND PROJECTION SYSTEM

BACKGROUND OF THE INVENTION

Field of the Invention

The present invention relates to a projector, a method for controlling the same, and a projection system.

Description of the Related Art

For a projector using a light valve (also called "spatial modulator") such as a liquid crystal display panel, pixel shifting has been known as a technology for artificially improving the resolution of an optical image (a projected image) formed on a projection plane (or a projection screen). Pixel shifting improves the apparent resolution of a projected image by sampling images from slightly different projection positions and projecting these images at high speeds (Japanese Patent Laid-Open No. 2017-27024).

Japanese Patent Laid-Open No. 2017-27024 discloses a configuration for artificially quadrupling the resolution of a projected image by quadrupling the frame rate to generate four subframes from one frame and shifting the projection positions of the subframes left, right, up, and down by ½ a pixel each.

To artificially increase the resolution of a projected image to n-times higher than the resolution of the light valve, Japanese Patent Laid-Open No. 2017-27024 requires a light valve operable at an n-fold frame rate and a mechanism for controlling the projection position precisely to support the n-fold frame rate. Thus, there is the issue of an increase in the cost and scale of the apparatus. When the frame rate of an input image is increased to improve the quality of the projected image, this becomes even more an issue.

SUMMARY OF THE INVENTION

The present invention provides a projector, a method for controlling the same, and a projection system which can alleviate the above-mentioned problem in the conventional technology and which can more effectively improve the resolution through pixel shifting.

According to an aspect of the present invention, there is provided a projector comprising: a first output unit configured to output a first optical image based on a frame inputted; a first position control unit configured to control a position of the first optical image such that the first optical image in a second subframe period is shifted in a first direction by a first distance relative to the first optical image in a first subframe period, a frame period of the frame including the first subframe period and the second subframe period; a second output unit configured to generate a second optical image based on the frame; a second position control unit configured to control a position of the second optical image such that the second optical image in the second subframe period is shifted in the first direction by the first distance relative to the second optical image in the first subframe period; and a projection unit configured to composite the first optical image and the second optical image such that the second optical image is shifted in a second direction different from the first direction by a second distance relative to the first optical image, and to project the composite optical image onto a projection plane.

According to another aspect of the present invention, there is provided a projection system which comprises: a first projector comprising a first output unit configured to output a first optical image based on an input frame, and a first position control unit configured to control a position of the first optical image such that the first optical image in a second subframe period is shifted in a first direction by a first distance relative to the first optical image in a first subframe period, a frame period of the frame including the first subframe period and the second subframe period; and a second projector comprising a second output unit configured to generate a second optical image based on the frame, and a second position control unit configured to control a position of the second optical image such that the second optical image in the second subframe period is shifted in the first direction by the first distance relative to the second optical image in the first subframe period, wherein the first projector and the second projector are adjusted to project the second optical image in a shifted state where the second optical image is shifted in a second direction different from the first direction by a second distance relative to the first optical image.

According to a further aspect of the present invention, there is provided a method for controlling a projector comprising: outputting a first optical image based on a frame inputted; controlling a position of the first optical image such that the first optical image in a second subframe period is shifted in a first direction by a first distance relative to the first optical image in a first subframe period, a frame period of the frame including the first subframe period and the second subframe period; generating a second optical image based on the frame; controlling a position of the second optical image such that the second optical image in the second subframe period is shifted in the first direction by the first distance relative to the second optical image in the first subframe period; compositing the first optical image and the second optical image such that the second optical image is shifted in a second direction different from the first direction by a second distance relative to the first optical image; and projecting the composite optical image onto a projection plane.

According to another aspect of the present invention, there is provided a control method of a projection system, wherein the projection system comprises: a first projector comprising a first output unit configured to output a first optical image based on an input frame, and a first position control unit configured to control a position of the first optical image such that the first optical image in a second subframe period is shifted in a first direction by a first distance relative to the first optical image in a first subframe period, a frame period of the frame including the first subframe period and the second subframe period; and a second projector comprising a second output unit configured to generate a second optical image based on the frame, and a second position control unit configured to control a position of the second optical image such that the second optical image in the second subframe period is shifted in the first direction by the first distance relative to the second optical image in the first subframe period, wherein the control method comprises adjusting the first projector and the second projector to project the second optical image in a shifted state where the second optical image is shifted in a second direction different from the first direction by a second distance relative to the first optical image.

According to a further aspect of the present invention, there is provided a non-transitory computer-readable medium storing a program executable by a processor included in a projector, wherein the program, when executed by the processor, causes the projector to function as: a first output unit configured to output a first optical image based on a frame inputted; a first position control unit configured to control a position of the first optical image such that the first optical image in a second subframe period is shifted in a first direction by a first distance relative to the first optical image in a first subframe period, a frame period of the frame including the first subframe period and the second subframe period; a second output unit configured to generate a second optical image based on the frame; a second position control unit configured to control a position of the second optical image such that the second optical image in the second subframe period is shifted in the first direction by the first distance relative to the second optical image in the first subframe period; and a projection unit configured to composite the first optical image and the second optical image such that the second optical image is shifted in a second direction different from the first direction by a second distance relative to the first optical image, and to project the composite optical image onto a projection plane.

Further features of the present invention will become apparent from the following description of exemplary embodiments with reference to the attached drawings.

BRIEF DESCRIPTION OF THE DRAWINGS

FIG. 5 is a timing diagram of the projection operation in the embodiments.

FIG. 7 is an illustration for describing improvement of the resolution in the first embodiment.

FIG. 10 is an illustration for describing improvement of the resolution in Modified Example 1 according to the first embodiment.

FIGS. 11A-11D relate to Modified Example 2 according to the first embodiment.

FIG. 14 is an illustration for describing improvement of the resolution in the second embodiment.

FIG. 15 is a schematic drawing of a projection system according to the third embodiment.

DESCRIPTION OF THE EMBODIMENTS

Exemplary embodiments of the present invention will now be described in detail in accordance with the accompanying drawings. It should be noted that the present invention is not limited by the embodiments described herein. Also, not all of the constituent elements described in the embodiments are necessarily essential to the present invention. In the embodiments, each of the functional blocks may be implemented by hardware, software, or a combination of hardware and software. Each functional block may be implemented by a plurality of pieces of hardware. Alternatively, a piece of hardware may implement a plurality of functional blocks. Further, one or more functional blocks may be implemented by a computer program in which one or more programmable processors (a CPU, an MPU, etc.) are loaded in a memory.

In the following embodiments, the present invention is applied to a stand-alone projector. However, the present invention is also applicable to a built-in projector in common electronic devices such as a personal computer, a smartphone, a tablet computer, a game console, or a digital (video) camera.

First Embodiment

Figure 1:
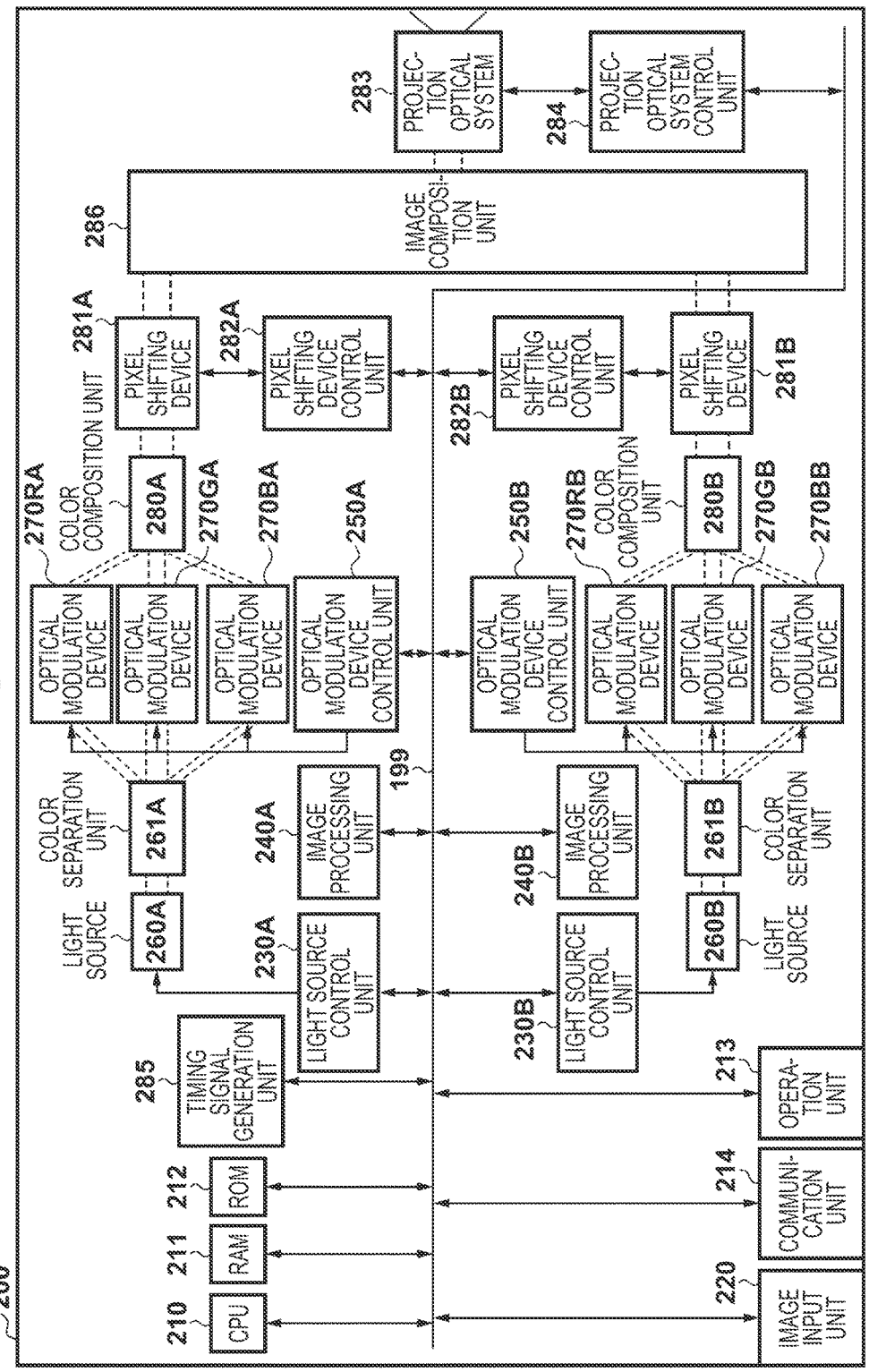
FIG. 1 is a block diagram showing an exemplary functional configuration of a projector according to the embodiments.

FIG. 1 is a block diagram showing an exemplary functional configuration of a projector 200 according to the first embodiment. The projector 200 has a pair of configurations for generating optical images, which are hereinafter referred to as optical systems A and B. In FIG. 1, corresponding constituent elements in these optical systems are indicated by the same reference numerals and distinguished from each other by the letter A or B. The following description does not distinguish between the optical systems A and B when such a distinction between the optical systems is not relevant. For example, content applicable to both a light source 260A and a light source 260B is described by referring to a light source 260.

A serial bus 199 is a communication path over which data and control signals are communicated between constituent elements connected to the bus.

A CPU 210 is an example of a programmable processor constituting a main control unit of the projector 200. The CPU 210 reads out a program stored in a ROM 212, loads the program to a RAM 211, and executes the program, thereby controlling various units in the projector 200 and realizing the function of the projector 200.

The ROM 212 stores not only programs to be executed by the CPU 210 but also GUI (Graphical User Interface) data, setup values, and the like. The ROM 212 may be rewritable.

The RAM 211 is a storage that serves as a working memory for temporarily storing programs and data for executing the programs. The RAM 211 also serves as buffer memory for received image data.

An operation unit 213 collectively refers to input devices (e.g., a switch, a button, a dial, a touch panel, etc.) that enable a user to give instructions to the projector 200. If the projector 200 is remote-controllable, the operation unit 213 also includes a signal receiving unit for receiving signals from a remote controller. The CPU 210 monitors operations made to the operation unit 213 and the reception of signals from the remote controller. The CPU 210 controls each unit of the projector 200, in response to the operation made to the operation unit 213, a signal received from the remote controller, and a control signal supplied from an external device through a communication unit 214.

An image input unit 220 is an interface that receives image data from an external device. The image input unit 220 has a connector compliant with a supported standard, and a communication unit. The image input unit 220 may receive image data from any external device without any particular limitation. Examples of external devices include, but are not limited to, electronic devices such as personal computers, tablet computers, media players, cameras, mobile telephones, smartphones, hard disk recorders, and game consoles. The image input unit 220 may be also configured to retrieve image data from a storage medium such as a USB memory or a memory card. Image data received through the image input unit 220 is stored in the RAM 211.

An image processing unit 240 processes the image data received by the image input unit 220 in a prescribed manner to generate a display image, and transmits the display image to an optical modulation device control unit 250. The image processing unit 240 may be, for example, an image processing microprocessor such as a GPU. Alternatively, the image processing unit 240 may be implemented by a program which is stored in the ROM 212 and executed by the CPU 210. The image processing applied by the image processing unit 240 includes, but is not limited to, changing the frame rate, pixel count, pixel value, image shape, and the like. The image data processed by the image processing unit 240 is not limited to image data received by the image input unit 220.

The functions of the image processing unit 240 include double-speed drive and resolution conversion (scaling). The image processing unit 240 can apply the above-mentioned image changing processing not only to image signals received from the image input unit 220 but also to an image or a video reproduced by the CPU 210.

A light source 260 may be, for example, a halogen lamp, a xenon lamp, a high pressure mercury vapor lamp, an LED, etc.

A light source control unit 230 turns the light source 260 on/off and controls the amount of light. The light source control unit 230 may be a dedicated microprocessor, or may be implemented by a program executed by the CPU 210.

From the light emitted by the light source 260, a color separation unit 261 generates a red (R) beam, a green (G) beam, and a blue (B) beam to be modulated by optical modulation devices 270R, 270G, and 270B. The color separation unit 261 may be, for example, composed of a dichroic mirror, a prism, or the like. If the light source 260 can emit a red (R) beam, a green (G) beam, and a blue (B) beam independently, the color separation unit 261 is not required.

Each of the optical modulation devices 270R, 270G, and 270B is, for example, a transmissive or reflective liquid crystal display panel, in which a plurality of pixels are arranged horizontally and vertically at a fixed pixel pitch. In this specification, the amount of pixel shifting is expressed using a unit in which a pixel pitch of the optical modulation device 270 is taken as one pixel. The optical modulation devices 270R, 270G, and 270B receive a red (R) beam, a green (G) beam, and a blue (B) beam, respectively. The optical modulation device control unit 250 controls the degree of modulation (transmittance or reflectance) of the optical modulation devices 270R, 270G, and 270B for each pixel, according to the red, green, and blue components in the display image generated by the image processing unit 240. Through this process, the beams transmitted through or reflected by the optical modulation devices 270R, 270G, and 270B form optical images corresponding to the red, green, and blue components in the display image.

A color composition unit 280 is composed of, for example, a dichroic mirror, a prism, or the like, and composites the optical images formed by the optical modulation devices 270R, 270G, and 270B. The color composition unit 280 sends out a full-color optical image corresponding to the display image.

A pixel shifting device 281 is provided in an optical path of the optical image output from the color composition unit 280, and slightly shifts the optical path utilizing light refraction. The pixel shifting device 281 is composed of, for example, a parallel plane glass plate and two actuators that support the glass plate at the top and the bottom thereof. Having said that, the pixel shifting device 281 may be configured in a different manner.

A pixel shifting device control unit 282 drives the pixel shifting device 281 such that the pixel shifting device 281 is in a different state in a first subframe period (a first period) and a second subframe period (a second period). Specifically, the pixel shifting device control unit 282 controls the inclination (orientation) of the parallel plane glass plate relative to the optical path, by driving the actuators of the pixel shifting device 281. The orientation and the amount of inclination of the parallel plane glass plate can control the direction in and the amount by which the optical path is shifted (i.e., the direction and the amount of pixel shifting). If the pixel shifting device 281 is not driven, pixel shifting is not applied to the optical image transmitted through the pixel shifting device 281. Namely, the pixel shifting device 281 applies dynamic pixel shifting (first pixel shifting) to the optical image, depending on the period.

The pixel shifting device 281 is not necessarily composed of a parallel plane glass plate, and may be composed of an optical element that can electrically control the refractive index. In this case, the pixel shifting device control unit 282 controls the voltage supplied to the optical element.

An image composition unit 286 composites optical images transmitted through the pixel shifting devices 281A and 281B, and supplies the composite optical image to a projection optical system. The image composition unit 286 may be, for example, composed of a dichroic mirror, a prism, or the like. In the present embodiment, when the image composition unit 286 composites the two optical images, the image composition unit 286 always shifts the images in a fixed direction by a fixed amount. The image composition unit 286 thus applies static pixel shifting (second pixel shifting) to the two optical images, regardless of the period. For example, the amount of pixel shifting by the image composition unit 286 is the same amount as, but in a different direction from, the pixel shifting by the pixel shifting device 281. By arranging the position of the optical member that constitutes the image composition unit 286 or making other adjustments, the image composition unit 286 can composite the two optical images in a shifted state in a specific direction by a specific amount. The amount and the direction of shifting applied by the image composition unit 286 to composite the optical images may be fixed or variable.

In the present embodiment, the pixel shifting device 281 is configured to horizontally shift a pixel by an amount that corresponds to half of the pixel pitch (hereinafter called "½ a pixel") of the optical modulation device 270. Note that a plus sign indicates rightward and downward pixel shifting, and a minus sign indicates leftward pixel shifting and upward pixel shifting, and the plus sign may be omitted. The image composition unit 286 is configured to composite the two optical images by shifting these images vertically by ½ a pixel. As a result, the projection position of the two optical images can be shifted in a horizontal direction and in a vertical direction by ½ a pixel each. The image composition unit 286 composites the two optical images such that the images are always shifted in a fixed direction by a fixed amount, and hence does not require any control during the projection period. As described, the present embodiment achieves pixel shifting by combining static position shifting and dynamic position shifting (shifting in a time-divisional manner). Eventually, even when the projection position is to be shifted in two directions, the pixel shifting device 281 needs to apply shifting in only one direction, so that the load on pixel shifting device 281 incurred due to the driving speed required of the pixel shifting device 281 and the drive control performed by the pixel shifting device 281.

A projection optical system 283 projects the composite optical image obtained from the image composition unit 286. The projection optical system 283 may be composed of a plurality of lenses and lens driving actuators.

A projection optical system control unit 284 drives the actuators in the projection optical system 283, and changes the projection magnification and the focal length of the statistical optical system. The projection optical system control unit 284 enables a lens shift function to shift the projection position by driving the actuators of the projection optical system 283 and shifting the optical axis of the projection optical system 283. The projection optical system control unit 284 may be a dedicated microprocessor, or may be implemented by a program executed by the CPU 210.

A timing signal generation unit 285 generates a timing signal to be utilized by the image processing unit 240 and the pixel shifting device control unit 282. The timing signal indicates an operation timing for realizing an output frame rate of the projector 200 that is double that of the input frame rate. Two frames output to one input frame are called "subframes". In the present embodiment, one frame period is equally divided into a first subframe period and a second subframe period. The timing signal also contains a signal indicating whether the generated subframe is a first subframe or a second subframe. The timing signal generation process will be described later.

A communication unit 214 is a communication interface for receiving control signals, still image data, moving image data, and the like from external devices. The communication unit 214 may be, for example, a communication interface compliant with a known communication standard, such as wireless LAN, wired LAN USB, or Bluetooth®, but the communication system is not limited thereto. If the image input unit 220 has, for example, an HDMI® interface, CEC communication is also possible via an external device connected to the image input unit 220 and the HDMI interface. The external device in this case may be any electronic device that can communicate with the projector 200.

Internal Configuration of the Image Processing Unit 240

Figure 2:
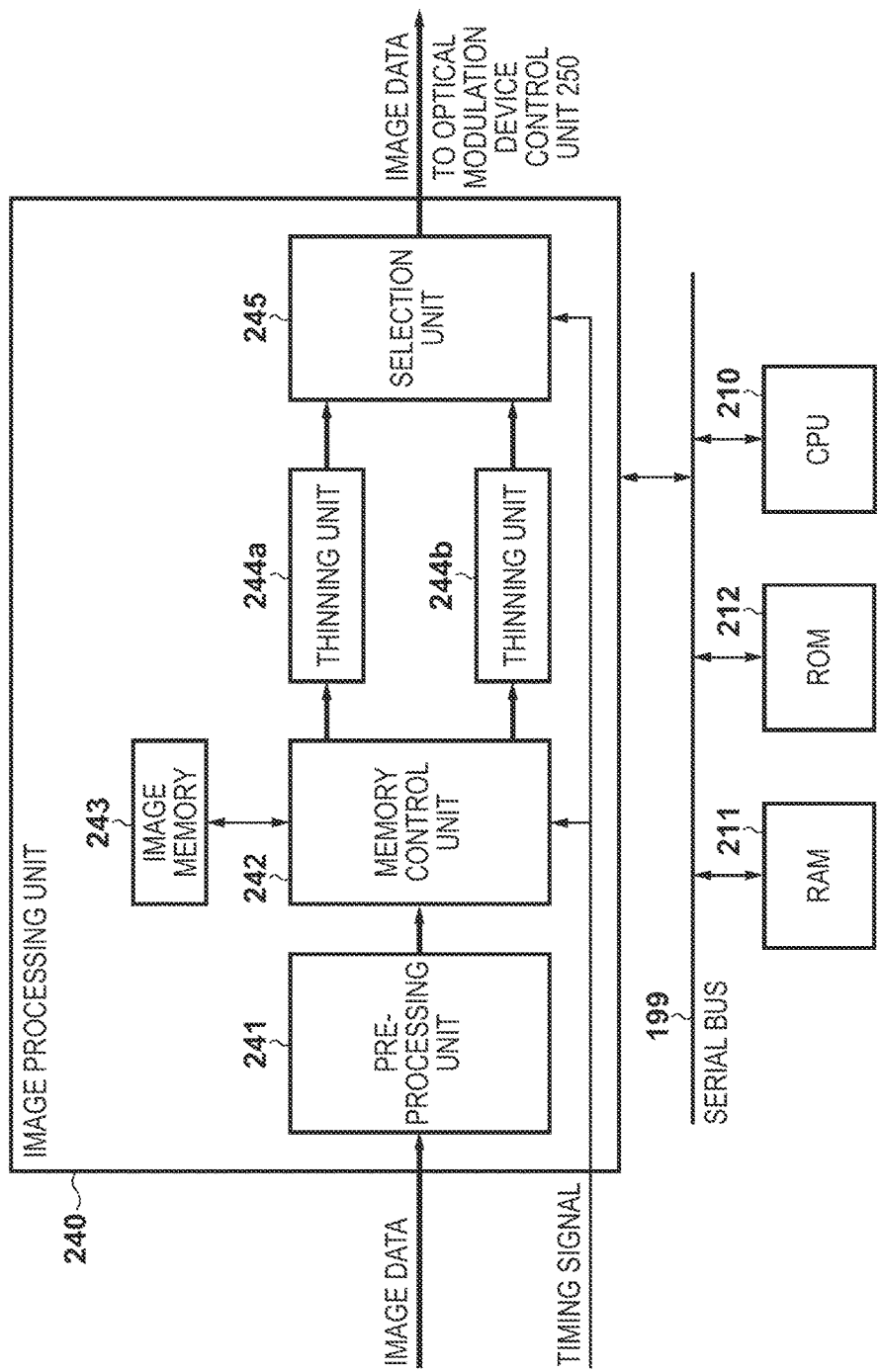
FIG. 2 is a block diagram showing an exemplary functional configuration of an image processing unit in the first embodiment.

The configuration of the image processing unit 240 is described next referring to FIG. 2. A preprocessing unit 241 converts (upconverts or downconverts) the resolution (the pixel count) of an input image to double that of the optical modulation device 270 in a horizontal direction and/or a vertical direction, while keeping the aspect ratio of the input image, and thereby generates a converted image. For example, the resolution conversion may be performed using, but not limited to, pixel interpolation such as bicubic interpolation or bilinear interpolation, super-resolution processing, thinning, and the like. If both the horizontal resolution and the vertical resolution of the input image are lower than double the corresponding resolutions of the optical modulation device 270, the preprocessing unit 241 upconverts (upscales) either the horizontal resolution or the vertical resolution to double the corresponding resolution of the optical modulation device 270. If either the horizontal resolution or the vertical resolution of the input image is higher than double the corresponding resolution of the optical modulation device 270, the preprocessing unit 241 downconverts (downscales) the horizontal resolution or the vertical resolution to double the corresponding resolution of the optical modulation device 270.

After the resolution of the input image is converted by the preprocessing unit 241, a memory control unit 242 writes the input image data into the image memory 243. According to the timing signal, the memory control unit 242 reads out the same input image data twice from the image memory 243 during one frame period, and thereby generates two subframes. Hence, if the frame rate of the input image is 60 fps, the memory control unit 242 generates subframes at a frame rate of 120 fps. The memory control unit 242 sends out the latest frame data received from the preprocessing unit 241, as subframe data.

From the pixels constituting the subframes, thinning units 244a and 244b thin out a portion of the pixels in a predetermined direction according to the predetermined direction and amount of pixel shifting, and thereby generate thinned images that have the resolution of the optical modulation device 270.

The thinning process executed by the thinning units 244a and 244b is further described with reference to FIG. 3. In this case, it is supposed that the preprocessing unit 241 has upconverted both the horizontal resolution and the vertical resolution of the input image to double the corresponding resolutions of the optical modulation device 270. Namely, the resolution of the upconverted image is four times higher than that of the optical modulation device 270. In the present embodiment, the thinning units 244a and 244b in the optical systems A and B generate thinned images by extracting pixels (thinning out other pixels) from patterns 101 to 104. The thinning process is described with reference to an exemplary area composed of four rows and four columns of pixels in the upconverted (upscaled) image. However, the thinning units 244a and 244b apply the thinning process in the same pattern to the entire upconverted image. Although the pixels are simply thinned out in this example, the pixels may be thinned out in a different manner (e.g., by bicubic interpolation) to form thinned images.

A selection unit 245 outputs the thinned images generated by the thinning units 244a and 244b, one by one, based on a timing signal. Specifically, if the timing signal indicates the first subframe period, the selection unit 245 outputs the thinned image generated by the thinning unit 244a. If the timing signal indicates the second subframe period, the selection unit 245 outputs the thinned image generated by the thinning unit 244b.

Projection Operation

Figure 4:
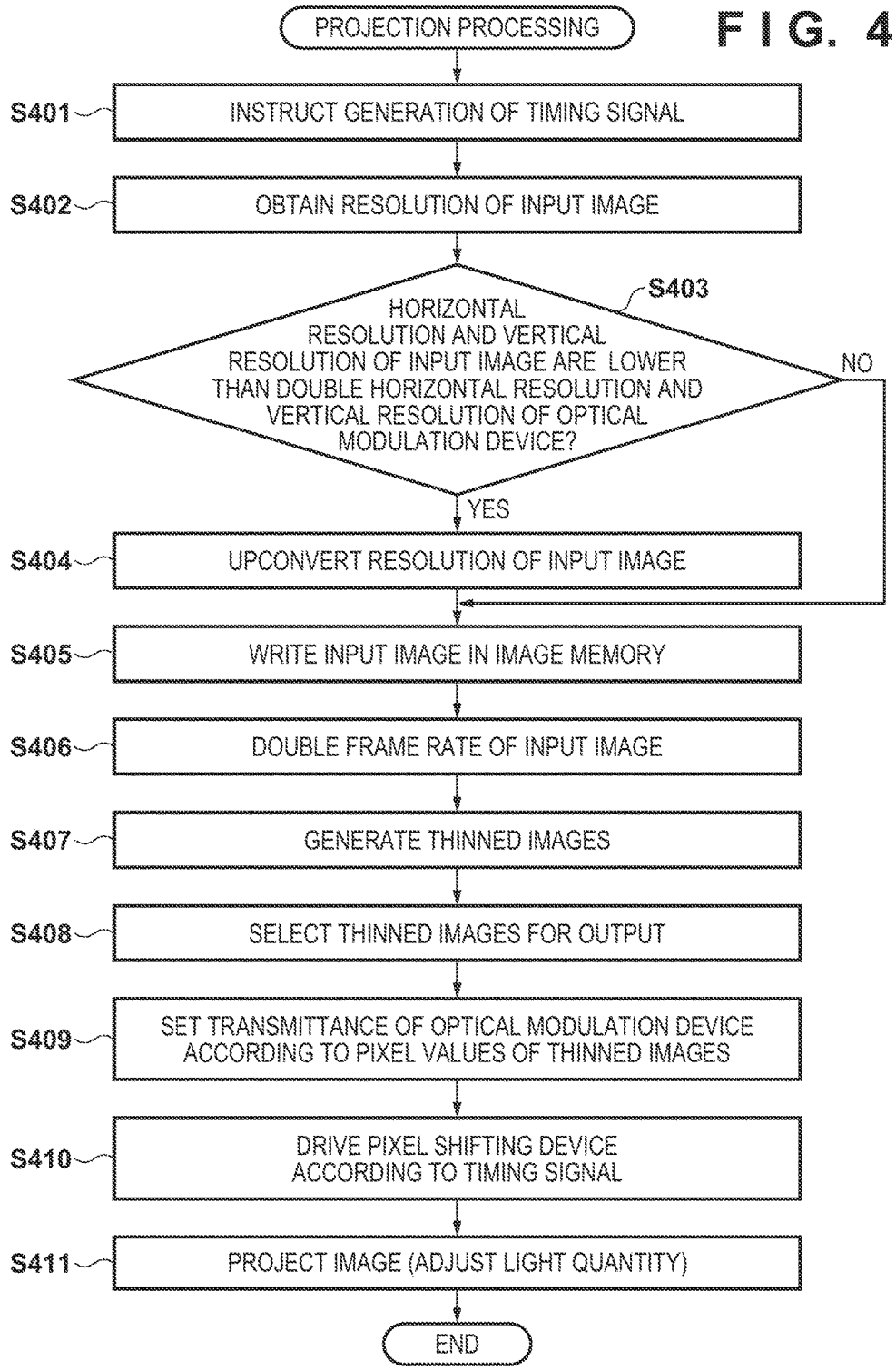
FIG. 4 is a flowchart of a projection operation in the embodiments.

The flowchart in FIG. 4 explains operations of the projector 200 for generating a projected image in which the resolution has been improved through pixel shifting. Pixel shifting may be enabled or disabled by selection of the projection mode, operations made to the operation unit 213, or the like.

In step S401, the CPU 210 instructs the timing signal generation unit 285 to generate a timing signal for operating at an output frame rate that is double the input frame rate. This is because pixel shifting as described herein relies on two subframes generated in one frame period. The timing signal generation unit 285 generates a timing signal in response to the instruction. A specific example of the timing signal will be described later.

In step S402, the CPU 210 obtains the resolution of the input image by referring to, for example, header information of the input image stored in the RAM 211 by the image input unit 220. The CPU 210 stores the thus obtained resolution of the input image in the RAM 211.

In step S403, the CPU 210 refers to the RAM 211 and decides whether the horizontal resolution and the vertical resolution of the input image are lower than double the corresponding resolutions of the optical modulation device 270. If the CPU 210 decides that both the horizontal resolution and the vertical resolution of the input image are lower than double the corresponding resolutions of the optical modulation device 270, the process advances to step S404. Otherwise, the process advances to step S405. Namely, if either the horizontal resolution or the vertical resolution of the input image is equal to or higher than double the corresponding resolution of the optical modulation device, the input image is not upconverted.

In step S404, the CPU 210 instructs the preprocessing unit 241 in the image processing unit 240 to upconvert the resolution of the input image. The preprocessing unit 241 upconverts the horizontal (or vertical) resolution of the input image to double the horizontal (or vertical) resolution of the optical modulation device, while keeping the aspect ratio of the input image.

In step S405, the memory control unit 242 in the image processing unit 240 stores, in the image memory 243, the upconverted image if upconversion was performed or otherwise stores the original input image.

In step S406, the memory control unit 242 in the image processing unit 240 reads out the image stored in the image memory 243 in step S405 twice according to the timing signal. The memory control unit 242 supplies a first readout image to the thinning unit 244a as the first subframe, and supplies a second readout image to the thinning unit 244b as the second subframe.

In step S407, the thinning units 244a and 244b in the image processing unit 240 extract (or thin out) pixels from the predetermined patterns, and thereby generate thinned images having the same resolution as the optical modulation device 270.

In step S408, the selection unit 245 in the image processing unit 240 sequentially outputs the thinned images generated by the thinning units 244a and 244b, according to the timing signal.

In step S409, the optical modulation device control unit 250 receives the thinned images sequentially output from the image processing unit 240 (the selection unit 245). The optical modulation device control unit 250 sets values to the pixels in the optical modulation devices 270R, 270G, and 270B, according to the color component (RGB) values of the pixels in the thinned images. The degree of modulation (transmittance, in this case) of each pixel is controlled in this manner.

In step S410, the pixel shifting device control unit 282 drives the actuators of the pixel shifting device 281 according to the timing signal, such that an optical path that corresponds to the amount and the direction of pixel shifting is realized during the subframe projection period in which the projection position is shifted. In the present embodiment, pixel shifting is not applied to the first subframe (the projection position is not changed). On the other hand, the projection position of the second subframe is shifted horizontally by ½ a pixel by shifting the optical path by ½ a pixel in a horizontal direction. The projection position corresponding to an optical path not subjected to pixel shifting is herein called the "reference projection position".

Hence, if the timing signal indicates the first subframe period, the pixel shifting device control unit 282 does not drive the actuators of the pixel shifting device 281, and projects the image at the reference projection position. On the other hand, if the timing signal indicates the second subframe period, the pixel shifting device control unit 282 drives the actuator of the pixel shifting device 281 such that the optical path is shifted horizontally by ½ a pixel.

In step S411, the light source control unit 230 turns the light source 260 on/off and controls the light amount thereof. Thus an optical image corresponding to each of the thinned images generated from the first subframe and the second subframe is generated. The image composition unit 286 optically composites the two optical images by vertically shifting the images by ½ a pixel and allows the composite image to enter the projection optical system 283.

FIG. 5 shows the timing signal and an example of process control as per the timing signal. In FIG. 5, the horizontal axis represents time, wherein Time tN (N being an integer of 1 or greater) corresponds to Time t0+TN, and T indicates the time interval.

The memory control unit 242 starts to write first frame data in the image memory 243 (sequences a and b) upon receiving the first frame of the input image at Time t0. The memory control unit 242 continues to receive the first frame until Time t2.

In order to realize a frame rate double that of the input frame rate, the timing signal generation unit 285 starts to generate a timing signal at Time t0. A cycle of the timing signal is the time interval T which is half a frame cycle (2T) of the input image (sequence c). The timing signal is supplied to the memory control unit 242 and the selection unit 245 in the image processing unit 240 and also to the pixel shifting device control unit 282.

From Time t2 to Time t4, the memory control unit 242 reads out the first frame data written in the image memory 243 according to the timing signal, and supplies the first subframe to the thinning unit 244a, and the second subframe to the thinning unit 244b. The thinning units 244a and 244b generate thinned images according to the patterns 101 to 104 described with reference to FIG. 3, and send the thinned images to the selection unit 245. In response to the timing signal for the first subframe, the selection unit 245 supplies the thinned image generated by the thinning unit 244a to the optical modulation device control unit 250. In response to the timing signal for the second subframe, the selection unit 245 supplies the thinned image generated by the thinning unit 244b to the optical modulation device control unit 250 (sequence d).

The optical modulation device control unit 250 obtains the thinned images from the image processing unit 240 (the selection unit 245) via the serial bus 199. The optical modulation device control unit 250 causes the optical modulation devices 270R, 270G, and 270B to perform rendering (set values to respective pixels) (sequence e) according to the color component (RGB) values of the pixels that constitute the thinned images. The optical modulation device control unit 250 notifies, through the serial bus 199, the pixel shifting device control unit 282 that the rendering by the optical modulation devices 270R, 270G, and 270B is complete.

Upon receiving the notification from the optical modulation device control unit 250 that the rendering is complete, the pixel shifting device control unit 282 decides whether to apply pixel shifting, based on the timing signal. If pixel shifting is required, the pixel shifting device control unit 282 performs pixel shifting (sequence f). In the present embodiment, the pixel shifting device control unit 282 decides not to apply pixel shifting if the timing signal indicates the first subframe period, and decides to apply horizontal pixel shifting by ½ a pixel if the timing signal indicates the second subframe period. When the pixel shifting device control unit 282 decides to apply pixel shifting, the pixel shifting device control unit 282 drives the actuators of the pixel shifting device 281 according to the amount and the direction of pixel shifting. Irrespective of whether pixel shifting has been applied or not, the pixel shifting device control unit 282 notifies the light source control unit 230 via the serial bus 199 that the pixel shifting process is complete.

The light source control unit 230 turns off the light source 260 (turns the light off) at the start of the rendering process, and turns on the light source 260 (turns the light on) upon receiving the notification from the pixel shifting device control unit 282 (sequence g). The light source control unit 230 may turn off the light source 260 based on the timing signal or based on the fact that the time of an ON time period has reached a predetermined time.

The first embodiment applies pixel shifting and provides a projected image as shown in FIGS. 6A to 6D and as described below. FIGS. 6A to 6D schematically show the relationship between the projection positions of pixels extracted from the input image by the thinning units 244aA, 244bA, 244aB, and 244bB as shown in FIG. 3. The following description relates only to the projection positions of 2×2 pixels (1A00, 2A00, 1B00, 2B00) in the input image. However, the same positional relationship is applicable to other pixels.

Figure 6A:
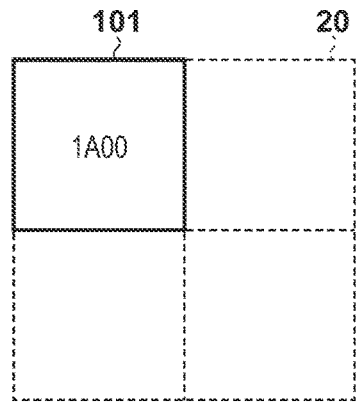
FIGS. 6A-6D relate to the construction of a projected image in the first embodiment.
Figure 6B:
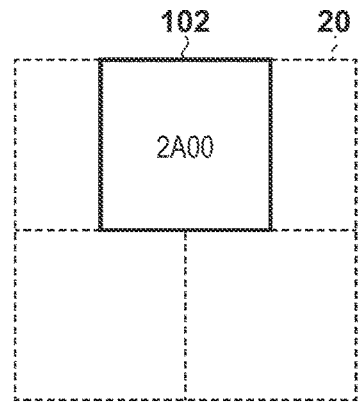

In FIGS. 6A to 6D, a grid 20 schematically represents pixel positions when an image is projected onto the reference projection position. Hence, the position of the pixel 1A00 (an image extracted from the pattern 101) projected onto the reference projection position matches the grid 20 (FIG. 6A). The pixel 2A00 constituting an image extracted from the pattern 102 by the thinning unit 244bA is shifted horizontally by ½ a pixel relative to the pixel 1A00 by the pixel shifting device 281, so that the projection position is also shifted by ½ a pixel (FIG. 6B). Since the image composition unit 286 does not apply pixel shifting to the pixels 1A00 and 2A00, their projection positions are not shifted vertically.

Figure 6C:
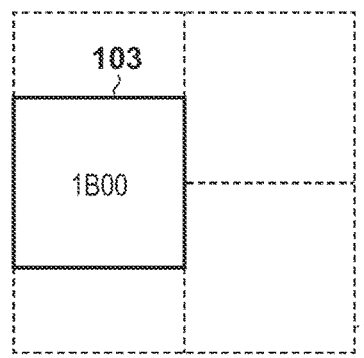
Figure 6D:
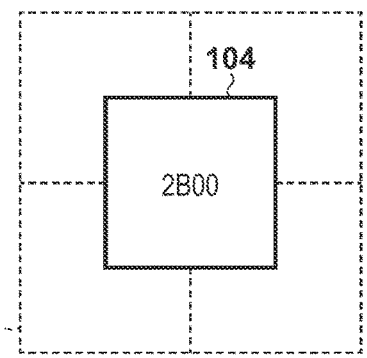

Meanwhile, the pixel 1B00 constituting an image extracted from the pattern 103 is not subjected to pixel shifting by the pixel shifting device 281, but is vertically shifted by ½ a pixel by the image composition unit 286. Hence, the projection position is shifted only vertically by ½ a pixel (FIG. 6C). The pixel 2B00 constituting an image extracted from the pattern 104 is horizontally shifted by ½ a pixel by the pixel shifting device 281, and is shifted vertically by ½ a pixel by the image composition unit 286. Hence, the projection position is shifted both horizontally and vertically by ½ a pixel each (FIG. 6D).

In the first subframe period, the image extracted from the pattern 101 is projected onto the reference projection position, and the image extracted from the pattern 102 is projected onto the position vertically shifted from the reference projection position by ½ a pixel. In the second subframe period, the image extracted from the pattern 103 is projected to a position horizontally shifted from the reference projection position by ½ a pixel, and the image extracted from the pattern 104 is projected to the position horizontally and vertically shifted from the reference projection position by ½ a pixel each.

As described above, the pixel shifting device 281 is employed to generate an optical image with no pixel shifting and an optical image shifted horizontally by ½ a pixel in one frame period, and the image composition unit 286 is employed to shift the optical images generated in the same frame period vertically by ½ a pixel and to composite the optical images. By combining dynamic pixel shifting by the pixel shifting device 281 and static pixel shifting by the composite optical system, and applying pixel shifting in different shifting directions but in the same shifting amount, the resulting configuration can achieve an effect similar to that achieved in Japanese Patent Laid-Open No. 2017-27024, at half the frame rate. Hence, this configuration can support a higher input frame rate than the configuration in Japanese Patent Laid-Open No. 2017-27024. Additionally, this configuration can reduce the cost of components required at the same input frame rate and can reduce the size of the projector.

The first embodiment improves the resolution in the manner as described below and as shown in FIG. 7. In the following description, the horizontal resolution and the vertical resolution of the input image 100 are assumed to be double the corresponding resolutions of the optical modulation device 270. Hence, no upconversion or downconversion is applied by the preprocessing unit 241.

In the case where the resolution of the input image and the resolution of the optical modulation device 270 are in the above-defined relationship, 2×2 pixels in the input image 100 correspond to one pixel 111 in the optical modulation device 270 (one pixel in a projected image). To describe the artificial improvement of the resolution through pixel shifting, FIG. 7 shows, for convenience, a projected image at the same resolution as the input image. If the projector generates a display image without performing pixel shifting and only by thinning out pixels from the input image, both the horizontal resolution and the vertical resolution of the projected image are reduced to half of the horizontal resolution and the vertical resolution of the input image.

On the other hand, according to the first embodiment, four images 1801 to 1804 are generated and projected in one frame period. Specifically, a composite optical image of the images 1801 and 1803 is projected in the first subframe period, and a composite optical image of the images 1802 and 1804 is projected in the second subframe period.

An image 1810 represents a sum of the images 1801 to 1804 projected in one frame period. One subframe period is so short (e.g., 1/60 of a second) that an observer perceives it as if the image 1810 was projected. The horizontal resolution and the vertical resolution of the image 1810 are double the corresponding resolutions of a projected image 110 generated without performing pixel shifting. This is because the application of horizontal shifting by ½ a pixel and vertical shifting by ½ a pixel allows every ¼-pixel-size area in the optical modulation device 270 to possess image information.

Modified Example 1

In the above description, a configuration was employed in which the pixel shifting device 281 applies horizontal pixel shifting and the image composition unit 286 applies vertical pixel shifting. It should be noted that the pixel shifting directions are interchangeable between the pixel shifting device 281 and the image composition unit 286. Further, pixel shifting may be applied in different directions, for example, in a diagonal 45-degree direction.

Figure 8:
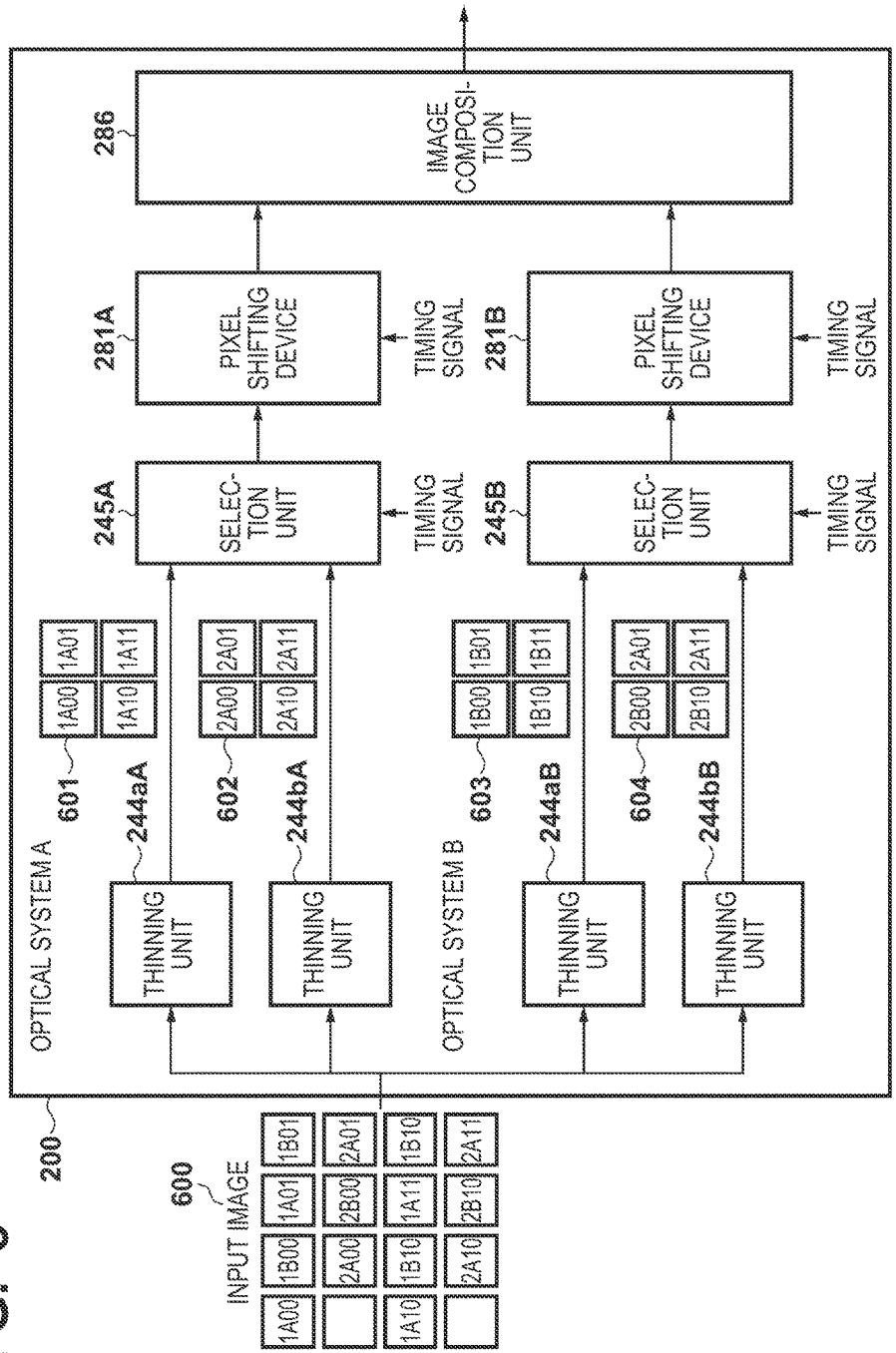
FIG. 8 is a diagram relating to Modified Example 1 according to the first embodiment.

As a modification of the first embodiment, FIG. 8 schematically shows the operation of the thinning units 244a and 244b, wherein the pixel shifting device 281 applies diagonal 45-degree pixel shifting and the image composition unit 286 applies horizontal pixel shifting. Similar to FIG. 3, the horizontal resolution and the vertical resolution of an input image 600 are assumed to be double the corresponding resolutions of the optical modulation device 270.

The thinning units 244a and 244b in the optical systems A and B generate thinned images by extracting the pixels (thinning out the other pixels) from patterns 601 to 604. The thinning process is described with reference to an exemplary area composed of four rows and four columns of pixels in the upconverted (upscaled) image. However, the thinning units 244a and 244b apply the thinning process in the same patterns to the entire upconverted image. Although the pixels are simply thinned out in this example, the pixels may be thinned out in a different manner (e.g., by bicubic interpolation) to form thinned images.

FIGS. 9A to 9D schematically show the relationship between the projection positions of pixels extracted from the input image by the thinning units 244aA 244bA, 244aB, and 244bB as shown in FIG. 8. The following description relates only to the projection positions of four pixels (1A00, 2A00, 1B00, and 2B00) in the input image. However, the same positional relationship is applicable to other pixels.

Figure 9A:
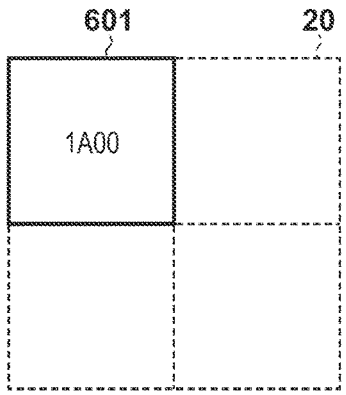
FIGS. 9A-9D relate to the construction of a projected image in Modified Example 1 according to the first embodiment.
Figure 9B:
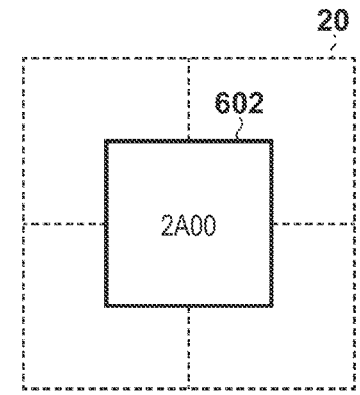

The position of the pixel 1A00 (an image extracted in the pattern 601) projected onto the reference projection position matches the grid 20 (FIG. 9A). The pixel 2A00 constituting an image extracted from the pattern 602 by the thinning unit 244bA is shifted diagonally at 45 degrees (horizontally and vertically by ½ a pixel each) relative to the pixel 1A00 by the pixel shifting device 281, so that the projection position is also shifted accordingly (FIG. 9B). Since the image composition unit 286 does not apply pixel shifting to the pixels 1A00 and 2A00, their projection positions are shifted only by the pixel shifting device 281 and not in any other manner.

Figure 9C:
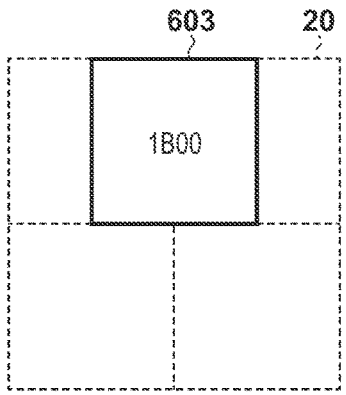
Figure 9D:
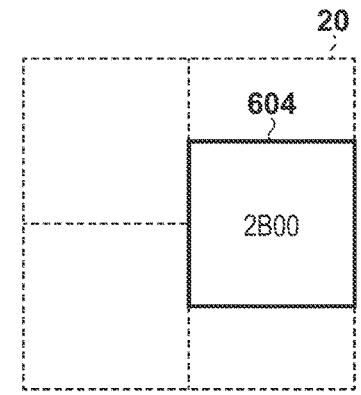

Meanwhile, the pixel 1B00 constituting an image extracted from the pattern 603 is not subjected to pixel shifting by the pixel shifting device 281, but the image composition unit 286 shifts the pixel 1B00 horizontally by ½ a pixel. Hence, the projection position is shifted only horizontally by ½ a pixel (FIG. 9C). The pixel 2B00 constituting an image extracted from the pattern 604 is horizontally and vertically shifted by ½ a pixel by the pixel shifting device 281, and is shifted horizontally by ½ a pixel by the image composition unit 286. Hence, the projection position is shifted horizontally by one pixel and vertically by ½ a pixel (FIG. 9D).

Modified Example 1 improves the resolution by combining diagonal 45-degree pixel shifting and horizontal pixel shifting, in the manner as described below and as shown in FIG. 10, which is similar to FIG. 7.

Four images 1901 to 1904 are generated and projected in one frame period. Specifically, a composite optical image of the images 1901 and 1903 is projected in the first subframe period, and a composite optical image of the images 1902 and 1904 is projected in the second subframe period.

An image 1910 represents a sum of the images 1901 to 1904 projected in one frame period. An observer perceives this as if the image 1910 was projected. The horizontal resolution and the vertical resolution of the image 1910 are double that of the corresponding resolutions of a projected image 610 generated without performing pixel shifting. This is because application of horizontal shifting by ½ a pixel and vertical shifting by ½ a pixel allows every ¼-pixel-size area in the optical modulation device 270 to possess image information.

As described above, combining diagonal 45-degree pixel shifting by the pixel shifting device 281 and horizontal pixel shifting by the composite optical system also ensures a similar effect to that achieved by combining horizontal pixel shifting and vertical pixel shifting.

Modified Example 2

As another modification, the pixel shifting devices 281A and 281B may apply pixel shifting in different directions. For example, the pixel shifting device 281A may apply diagonal 45-degree pixel shifting downward and to the right (horizontally and vertically by +½ a pixel each), whereas the pixel shifting device 281B may apply diagonal 45-degree pixel shifting upward and to the right (horizontally by ½ a pixel and vertically by −½ a pixel).

FIGS. 11A to 11D schematically show the relationship between the projection positions of pixels extracted from the input image by the thinning units 244aA 244bA, 244aB, and 244bB, in the case where the pixel shifting devices 281A and 281B apply pixel shifting in different directions. The following description relates only to the projection positions of four pixels (1A00 2A00, 1B00, and 2B00) in the input image. However, the same positional relationship is applicable to other pixels. As described above, the thinning units 244aA and 244aB extract pixels from the patterns 101 and 103. In this modified example, however, the thinning unit 244bA extracts the pixels from the pattern 104, and the thinning unit 244bB extracts the pixels from the pattern 102.

The position of the pixel 1A00 (an image extracted in the pattern 101) projected to the reference projection position matches the grid 20 (FIG. 11A). The pixel 2B00 constituting an image extracted from the pattern 104 by the thinning unit 244bA is shifted, relative to the pixel 1A00, diagonally at 45 degrees (horizontally and vertically by +½ a pixel each) by the pixel shifting device 281A, so that the projection position is also shifted accordingly (FIG. 11B). Since the image composition unit 286 does not apply pixel shifting to the pixels 1A00 and 2B00, their projection positions are shifted only by the pixel shifting device 281A and not in any other manner.

Meanwhile, the pixel 1B00 constituting an image extracted from the pattern 103 by the thinning unit 244aB is not subjected to pixel shifting by the pixel shifting device 281B, but is shifted vertically by +½ a pixel by the image composition unit 286. Hence, the projection position is shifted only vertically by ½ a pixel (FIG. 11C). The pixel 2A00 constituting an image extracted from the pattern 102 by the thinning unit 244bB is shifted horizontally by ½ a pixel and vertically by −½ a pixel by the pixel shifting device 281, and thereafter is shifted vertically by ½ a pixel by the image composition unit 286. Since the amount of vertical pixel shifting by the pixel shifting device 281 and the amount of vertical pixel shifting by the image composition unit 286 cancel each other out, the projection position is shifted horizontally by ½ a pixel relative to the reference position (FIG. 11D).

As apparent from the comparison between FIGS. 11A to 11D and FIGS. 6A to 6D, four images are projected in one frame period also in this modified example, in a manner similar to the case where the pixel shifting device 281 applies horizontal pixel shifting by ½ a pixel and the image composition unit 286 applies the vertical shifting by ½ a pixel.

Other Modified Examples

As described above, the direction and the amount of pixel shifting applied by the pixel shifting device 281 and the image composition unit 286 may be combined in any manner as long as the following four types of images are obtained: an image generated without performing pixel shifting, an image generated with horizontal pixel shifting by ½ a pixel, an image generated with vertical pixel shifting by ½ a pixel, and an image generated with horizontal pixel shifting and vertical pixel shifting by ½ a pixel each.

Additionally, pixel shifting by the pixel shifting device 281 and pixel shifting (composition) by the image composition unit 286 may be applied in reverse order. In this case, the image composition unit 286 is provided in each optical system. An image composition unit 286A composites images generated by the thinning units 244aA and 244bA, with 50% weight on each image. Similarly, an image composition unit 286B composites images generated by the thinning units 244aB and 244bB, with 50% weight on each image. The selection unit 245 selects either the composite image generated by the image composition unit 286A or the composite image generated by the image composition unit 286B, according to the timing signal. The pixel shifting device 281 applies pixel shifting in the first or second subframe period.

As described above, these modified examples also combine dynamic pixel shifting applied by driving the pixel shifting device and static pixel shifting performed by the composite optical system, and applies pixel shifting in different shifting directions in the same shifting amount. The resulting configurations can reduce the driving speed of the pixel shifting device to half the conventional driving speed. Hence, these configurations can respond to an input frame rate that is double that of the conventional configuration. Additionally, these configurations can reduce the cost of components required for the same input frame rate, and can reduce the size of the projector.

Second Embodiment

Next, the second embodiment of the present invention is described. The present embodiment also combines pixel shifting by the pixel shifting device and pixel shifting by the composite optical system, but is different from the first embodiment in adopting the same pixel shifting direction and different amounts of pixel shifting. Since the present embodiment can be performed by the projector 200 configured as shown in FIG. 1, the following description focuses on operational differences, and omits the description of the configuration of the projector 200. It should be noted, however, in order to enable 45-degree diagonal movement by the pixel shifting device 281, the positions of the two actuators are changed to a diagonally opposed relationship in a 45-degree direction, or the parallel plane glass plate is supported by four actuators positioned at the left, right, top, and bottom of the glass plate.

Figure 3:
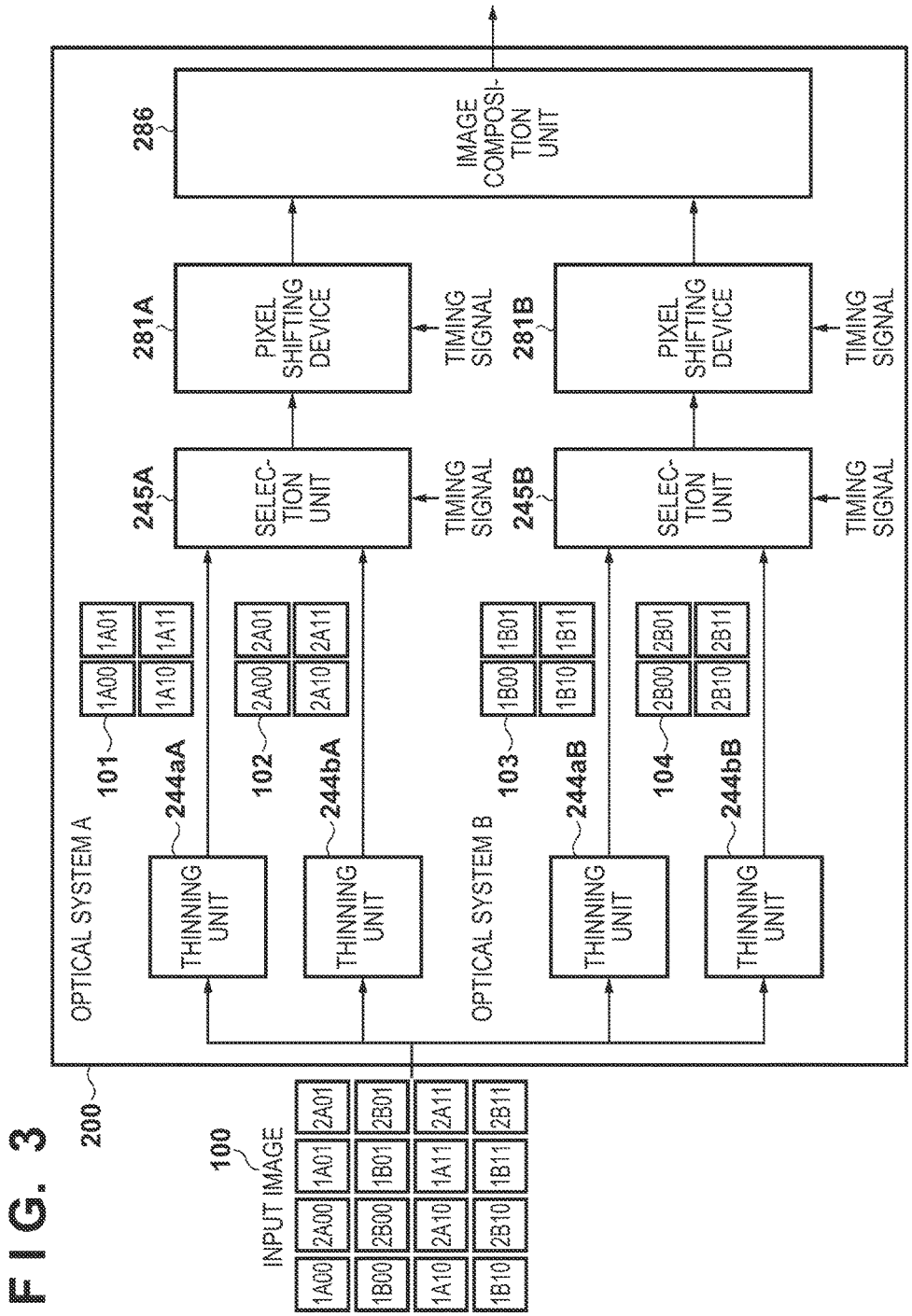
FIG. 3 is a diagram relating to an operation of the image processing unit in the first embodiment.
Figure 12:
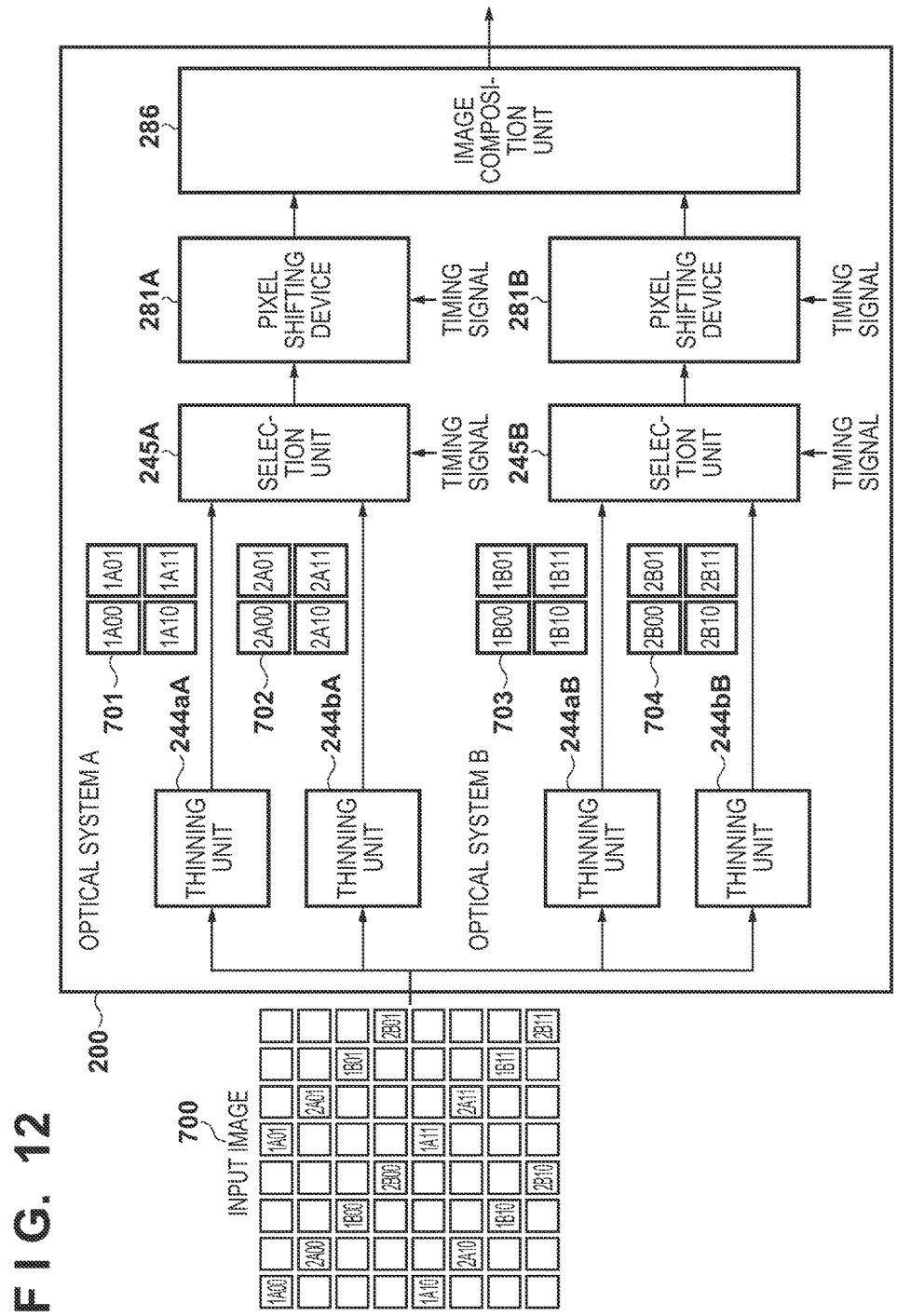
FIG. 12 illustrates the construction of a projected image in Modified Example 2 according to the first embodiment.

The pixel shifting method according to the second embodiment is outlined with reference to FIG. 12 which is a schematic drawing similar to FIG. 3. In the present embodiment, the preprocessing unit 241 upconverts (upscales) or downconverts (downscales) the horizontal resolution and the vertical resolution of the input image into four times the corresponding resolutions of the optical modulation device 270. In FIG. 12, the horizontal resolution and the vertical resolution of an input image 700 are assumed to be already four times as high as the corresponding resolutions of the optical modulation device 270. Hence, no upconversion or downconversion is applied in the preprocessing unit 241. One frame period is equally divided into a first subframe period and a second subframe period.

The thinning units 244aA, 244bA, 244aB, and 244bB extract pixels from the input image 700 according to patterns 701 to 704, and generate a display image that has the resolution of the optical modulation device 270.

If the timing signal indicates the first subframe period, the selection units 245A and 245B select and output the images generated by the thinning units 244aA and 244aB. If the timing signal indicates the second subframe period, the selection unit 245A and 245B select and output the images generated by the thinning units 244bA and 244bB. The first subframe period and the second subframe period respectively correspond to the first half and the second half of one frame period which is equally divided into halves.

FIGS. 13A to 13D schematically show, in a manner similar to FIGS. 6A to 11D, the relationship between the projection positions of pixels extracted from the input image by the thinning units 244aA, 244bA, 244aB, and 244bB in the present embodiment. The following description relates only to the projection positions of four pixels (1A00, 2A00, 1B00, and 2B00) in the input image. However the same positional relationship is applicable to the other pixels.

In the present embodiment, the pixel shifting device 281 applies diagonal 45-degree pixel shifting downward and to the right by a ¼ of a pixel (horizontally and vertically by a +¼ of a pixel each). The image composition unit 286 applies diagonal pixel shifting downward and to the right by ½ a pixel (horizontally and vertically by +½ a pixel each). Pixel shifting by the pixel shifting device 281 is applied in the second subframe period.

Figure 13A:
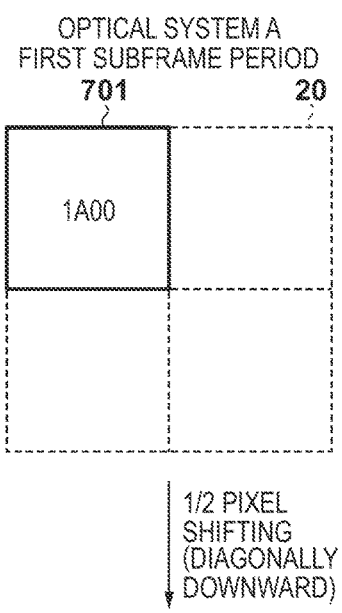
FIGS. 13A-13D relate to the construction of a projected image in the second embodiment.
Figure 13B:
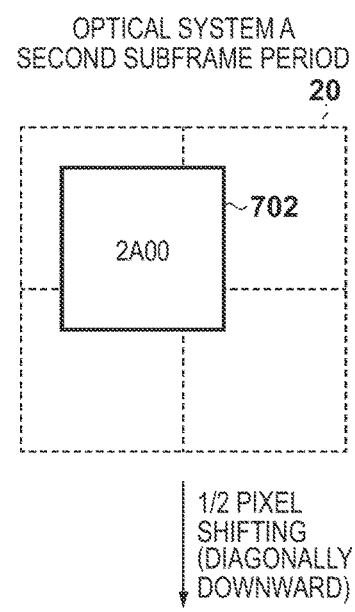

The position of the pixel 1A00 (an image extracted from the pattern 701) projected to the reference projection position matches the grid 20 (FIG. 13A). The pixel 2A00 constituting an image extracted from the pattern 702 by the thinning unit 244bA is shifted, relative to the pixel 1A00, diagonally at 45 degrees downward and to the right by a ¼ of a pixel by the pixel shifting device 281A, so that the projection position is also shifted accordingly (FIG. 13B). Since the image composition unit 286 does not apply pixel shifting to the pixels 1A00 and 2A00, their projection positions are shifted only by the pixel shifting device 281A and not in any other manner.

Figure 13C:
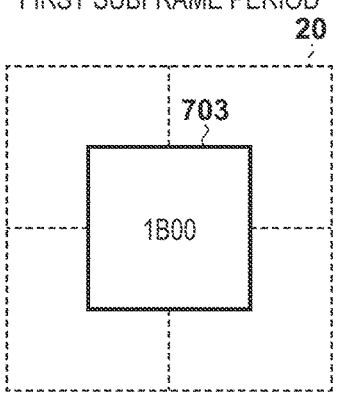
Figure 13D:
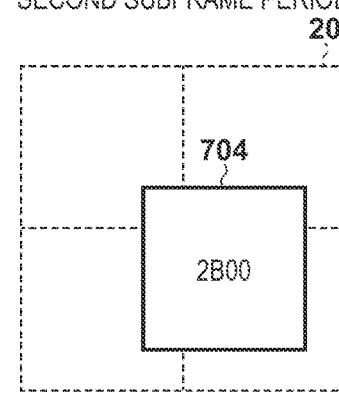

Meanwhile, the pixel 1B00 constituting an image extracted from the pattern 703 by the thinning unit 244aB is not subjected to pixel shifting by the pixel shifting device 281B, but is shifted diagonally at 45 degrees downward and to the right by ½ a pixel by the image composition unit 286. Hence, the projection position is shifted both horizontally and vertically by ½ a pixel each (FIG. 13C). The pixel 2B00 constituting an image extracted from the pattern 704 by the thinning unit 244bB is shifted diagonally at 45 degrees downward and to the right by a ¼ of a pixel by the pixel shifting device 281B, and thereafter is shifted diagonally at 45 degrees downward and to the right by ½ a pixel by the image composition unit 286. As a result, the projection position is shifted horizontally and vertically by ¾ of a pixel each relative to the reference position (FIG. 13D).

The second embodiment improves the resolution through diagonal 45-degree pixel shifting, in the manner as described below and as shown in FIG. 14 which is similar to FIG. 7. The horizontal resolution and the vertical resolution of the input image 700 are four times higher than the corresponding resolutions of the optical modulation device 270. Hence, 4×4 pixels in the input image 700 correspond to one pixel 711 in the optical modulation device 270 (one pixel in a projected image).

Four images 2001 to 2004 are generated and projected in one frame period. Specifically, a composite optical image of the images 2001 and 2003 is projected in the first subframe period, and a composite optical image of the images 2002 and 2004 is projected in the second subframe period.

An image 2010 represents a sum of the images 2001 to 2004 projected in one frame period. An observer perceives this as if the image 2010 was projected. The horizontal resolution and the vertical resolution of the image 2010 are four times higher than the corresponding resolutions of a projected image 710 generated without performing pixel shifting. This is because the application of horizontal shifting by a ¼ of a pixel and vertical shifting by a ¼ of a pixel allows every 1/16-pixel-size area in the optical modulation device 270 to possess image information.

To achieve a higher resolution in the present embodiment, the amount of pixel shifting by the pixel shifting devices 281A and 281B and the amount of pixel shifting by the plurality of optical systems need to be different from each other. If both types of pixel shifting are applied in the same direction and in the same amount, the images of the optical systems A and B completely overlap each other, and thus a higher resolution cannot be expected.

The present embodiment combines dynamic pixel shifting by the pixel shifting device and static pixel shifting by the composite optical system, and applies pixel shifting in the same shifting directions in different shifting amounts. The resulting configuration can provide a projected image having 16 times higher resolution (pixel count) than the optical modulation device, at a frame rate double that of the input frame rate.

The present embodiment sets the direction of pixel shifting to a diagonal 45-degree direction, the amount of pixel shifting by the pixel shifting device to a ¼ of a pixel, and the amount of pixel shifting by the image composition unit to ½ a pixel. However, the amount of pixel shifting by the pixel shifting device may be ½ a pixel, and the amount of pixel shifting by the image composition unit may be a ¼ of a pixel.

Similar to the first embodiment, pixel shifting by the pixel shifting device and pixel shifting (composition) by the image composition unit may be applied in reverse order.

Third Embodiment

Next, the third embodiment of the present invention is described. The first and second embodiments use a single projector to generate a plurality of optical images, to apply dynamic pixel shifting by the pixel shifting device to the plurality of optical images, and to optically composite the plurality of optical images (to apply static pixel shifting). As an alternative configuration, it is also possible to generate a plurality of optical images with one projector, to apply dynamic pixel shifting by the pixel shifting device using another projector, and to apply pixel shifting and composite the optical images on the projection plane. This alternative configuration can achieve the same effect.

FIG. 15 is a schematic drawing of a projection system for carrying out the present embodiment.

The projection system has two projectors 800A and 800B. The projectors 800A and 800B are positioned and set such that a projection area 801A of the projector 800A and a projection area 801B of the projector 800B are shifted from each other in a direction and by an amount similar to pixel shifting applied by the image composition unit 286 in the first or second embodiment. In FIG. 15, an area 802 shows a shift between the projection area 801A and the projection area 801B with emphasis. In this drawing, the projection area 801B is shifted downward by ½ a pixel relative to the projection area 801A, with no horizontal shift. An identical input image is supplied to the projectors 800A and 800B.

Figure 16:
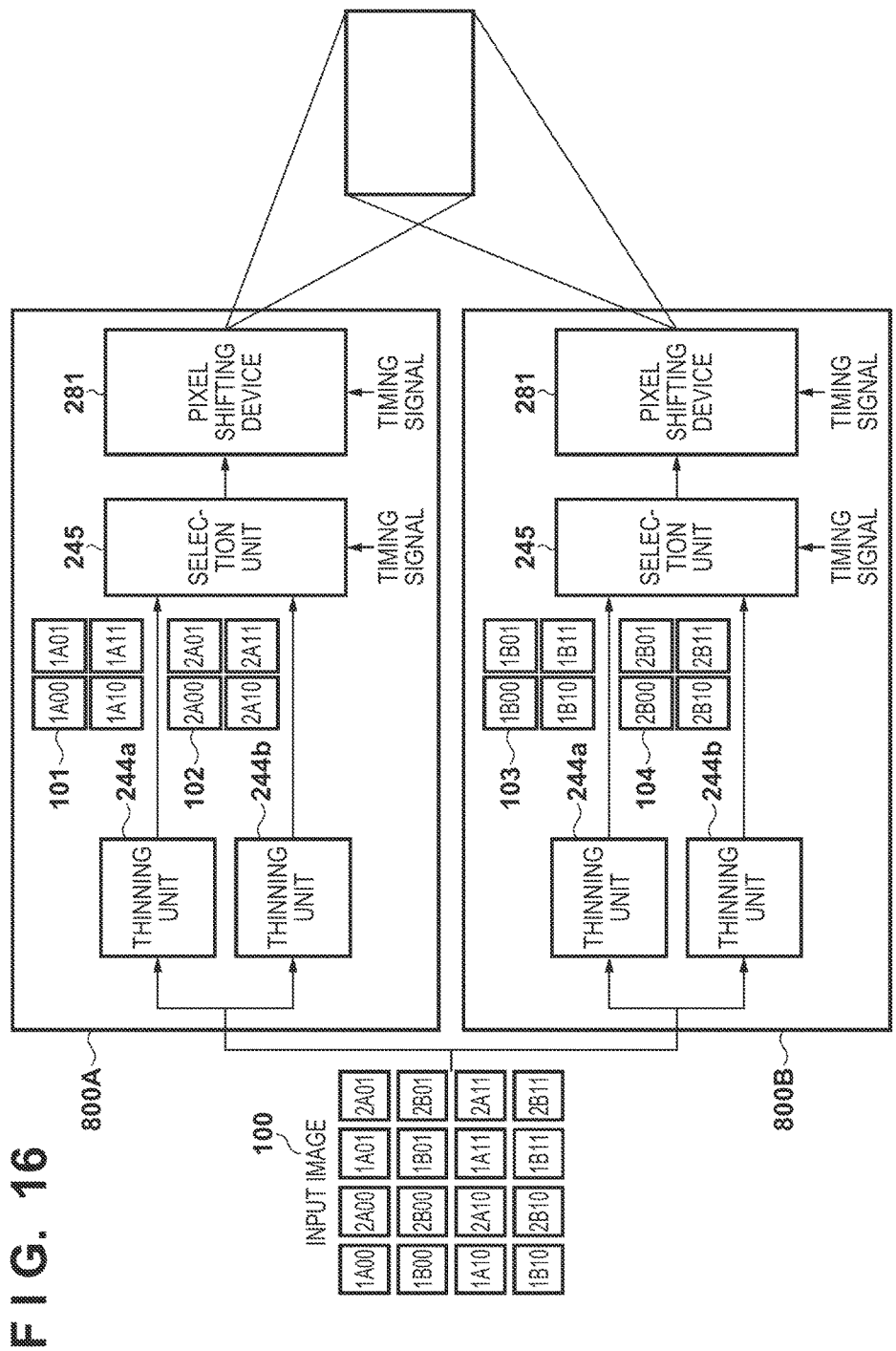
FIG. 16 relates to the construction of a projected image in the third embodiment.

Pixel shifting according to the third embodiment is outlined with reference to FIG. 16. FIG. 16 shows a configuration for performing a projection operation using the projectors 800A and 800B, in a manner similar to the projection operation using the projector 200. As shown in FIG. 16 and as apparent from the comparison with FIG. 3, the optical systems A and B in the first embodiment are separately provided in the projectors 800A and 800B, respectively, and the image composition unit is omitted. The optical system A includes the thinning units 244aA and 244bA, the selection unit 245A, and the pixel shifting device 281A. The optical system B includes the thinning units 244aB and 244bB, the selection unit 245B, and the pixel shifting device 281B. These constituent elements operate in the same manner as in the first embodiment, and hence are not described herein. Additionally, the projectors 800A and 800B can be utilized to perform a projection operation in a manner similar to the projection operation using the projector 200 in the second embodiment. Also in this case, the optical systems A and B in FIG. 12 are separately provided in the projectors 800A and 800B, respectively, and the image composition unit is omitted.

In the present embodiment, an optical image A is obtained through the pixel shifting device 281A and projected from the projector 800A, and an optical image B is obtained through the pixel shifting device 281B and projected from the projector 800B. The projection positions of the projectors 800A and 800B are shifted vertically by ½ a pixel, and as a result, the optical image B is shifted vertically by ½ a pixel relative to the optical image A, and the shifted optical image B is optically composited with the optical image A on the projection plane. In the first subframe period, the pixel shifting devices 281A and 281B do not apply pixel shifting to the optical images A and B. Meanwhile, in the second subframe period, the pixel shifting devices 281A and 281B apply horizontal shifting by ½ a pixel to the optical images A and B. Thus a projected image similar to the one provided in the first embodiment can be obtained.

Overall Configuration of the Projector in the Third Embodiment

Figure 17:
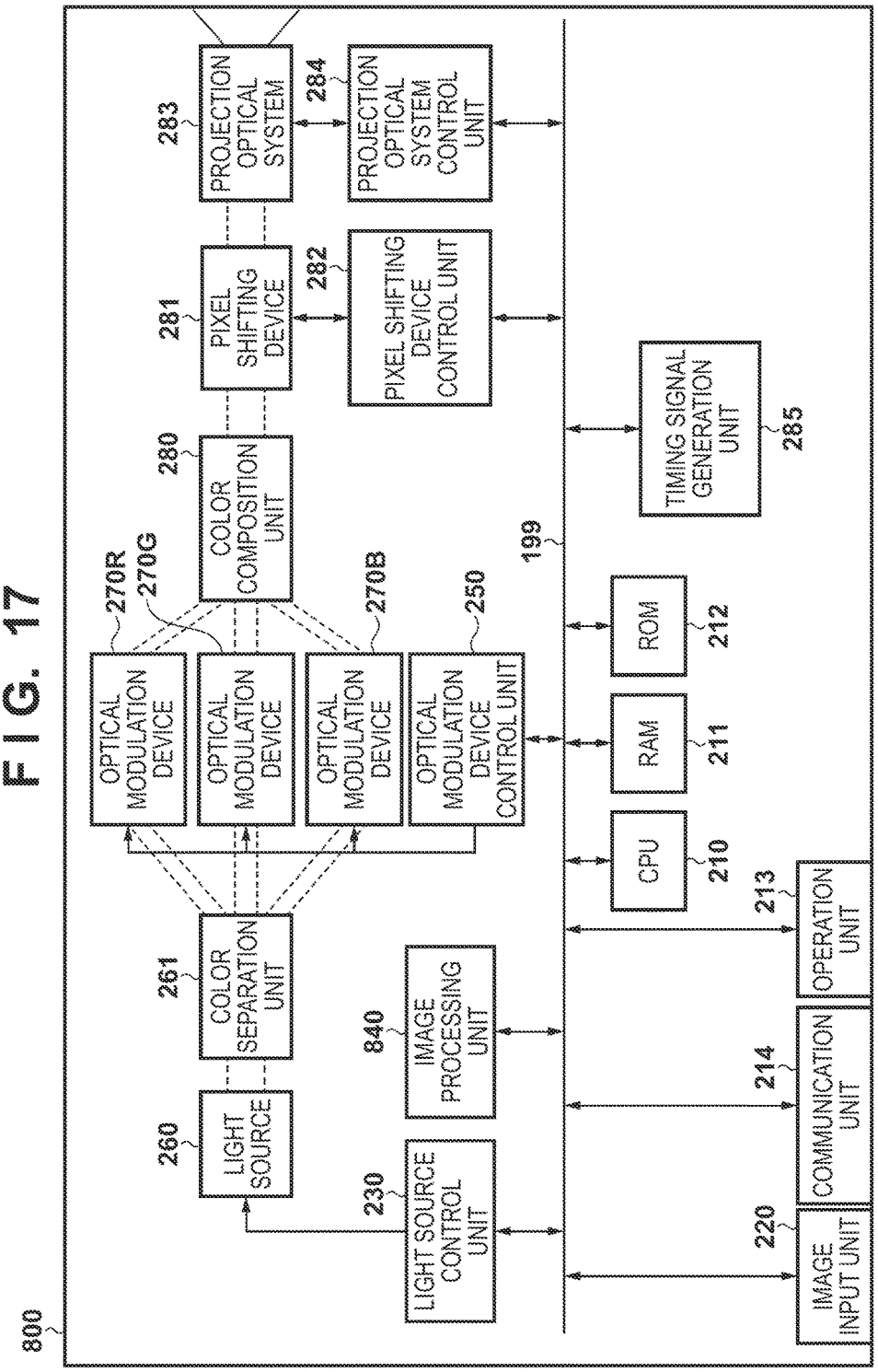
FIG. 17 is a block diagram showing an exemplary functional configuration of each projector in the third embodiment.
Figure 18:
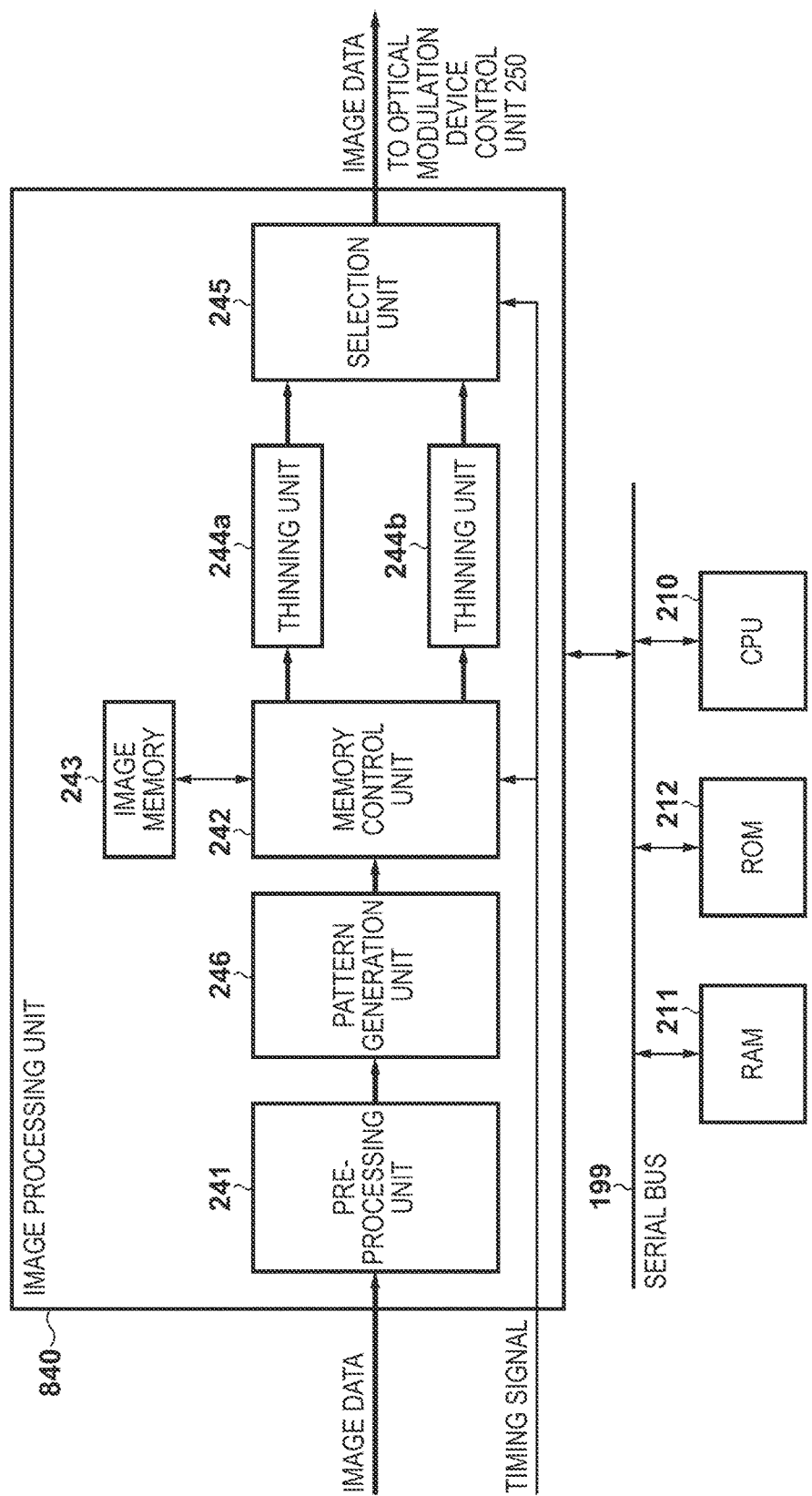
FIG. 18 is a block diagram showing an exemplary functional configuration of an image processing unit in the third embodiment.

FIG. 17 shows an exemplary functional configuration of a projector 800 which can serve as either of the projector 800A or 800B in the third embodiment. In FIG. 17, the same functional blocks as already described with the projector 200 are indicated by the same reference numerals used in FIG. 1, and are not described herein. The projector 800 has an image processing unit 840 which is different from the image processing unit in the first embodiment, and thus the configuration of the image processing unit 840 is described with reference to FIG. 18.

The image processing unit 840 additionally includes a pattern generation unit 246 downstream of the preprocessing unit 241 of the image processing unit 240 in the first embodiment. Apart from the pattern generation unit 246, the image processing unit 840 has the same constituent elements as the image processing unit 240. Such constituent elements are indicated by the same reference numerals as used in FIG. 2 to omit their description.

According to the instructions by the CPU 210, the pattern generation unit 246 generates a pattern image for adjusting the projection position with the other projector, and composites the pattern image with the display image output from the preprocessing unit 241. The pattern generation unit 246 sends the composite image to the memory control unit 242. The constituent elements downstream of the memory control unit 242 operate irrespective of whether the display image is composited with the pattern image. The pattern image for adjustment of the projection position will be detailed later.

Described next is an example of the method for adjusting the projection positions of the projectors 800A and 800B (for shifting the projection area 801B vertically by ½ a pixel relative to the projection area 801A). In this example, a pattern image is projected from each of the projectors 800A and 800B, and the projection position is adjusted by a lens shift function. The lens shift function is to shift the projection position by shifting the optical axis of a projection optical system 283 from the center of the optical modulation device 270, without changing the angle between the projection plane and the optical axis.

To utilize the lens shift function, the projectors 800A and 800B need to be installed directly opposite to the projection plane (such that the optical axis of the projection optical system is orthogonal to the projection plane). For example, the pattern generation unit 246 generates and projects a cross-shaped pattern (a cross pattern), and reflects a projected image off a mirror placed on the projection plane. When the projector 800 is moved until the crosspoint of the cross pattern in the reflected light is projected at the center of the projection optical system, the projector 800 can be directly opposite to the projection plane. The distance from the projection plane and/or the zoom magnification of the projectors 800A and 800B is/are set such that the projectors 800A and 800B can provide images in the same projection size.

After the projectors 800A and 800B are installed directly opposite to the projection plane, the projection position of at least one of the projectors 800A and 800B is shifted to give a shift by ½ a pixel. To start with, each of the projectors 800A and 800B projects a pattern image for projection position adjustment. The instruction to project a pattern image and the selection of a pattern image to be projected are given by a user, for example, operating a menu via the operation unit 213.

Figure 19:
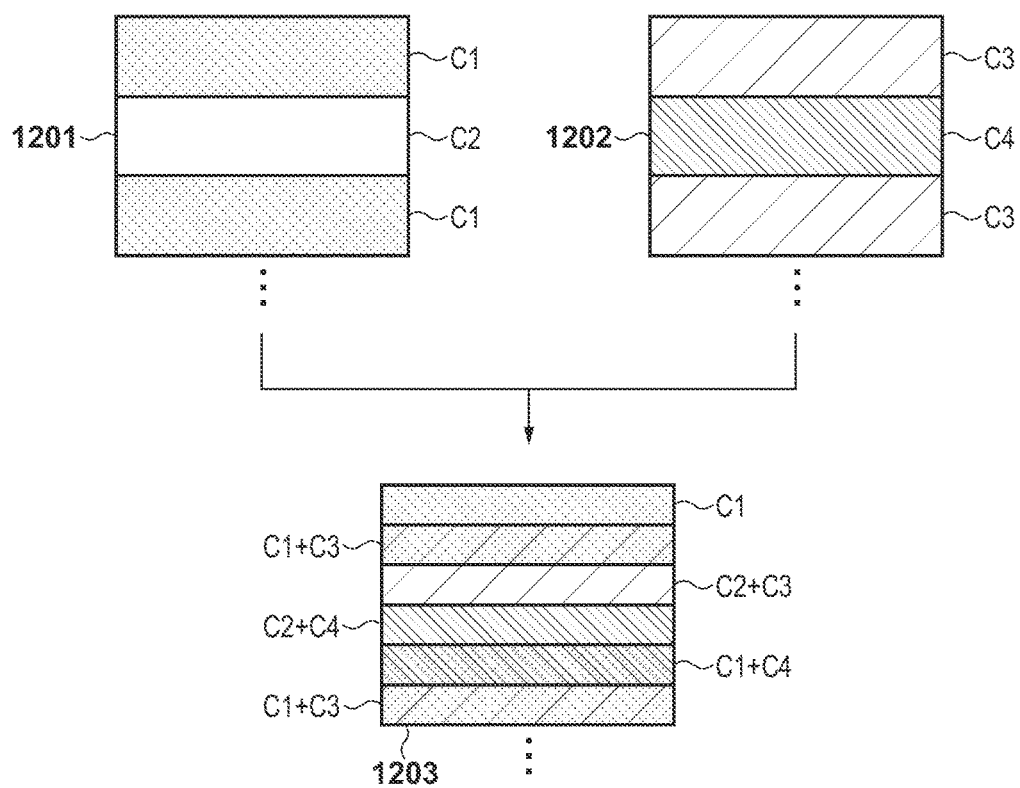
FIG. 19 shows exemplary pattern images employed in the third embodiment.

FIG. 19 shows exemplary pattern images. Pattern images 1201 and 1202 projected by the projectors 800A and 800B have a line width of one pixel. Each pattern image is composed of two types of horizontal lines which have different tones and which alternate in the vertical direction. The pattern image 1201 is composed of horizontal lines having tone values C1 and C2, and the pattern image 1202 is composed of horizontal lines having tone values C3 and C4. The tone values C1 to C4 are different from each other.

A user looks at a composite image of the pattern images 1201 and 1202 on the projection plane, and adjusts the projection positions by using the lens shift function of the projector(s) 800A and/or 800B such that the composite image observed on the projection plane looks like a projected image 1203. The projected image 1203 is ½ a pixel wide, and is composed of horizontal lines having different tone values. The horizontal lines are arranged in the order of C1, C1+C3, C2+C3, C2+C4, . . . (thereafter repeating C1+C3, C2+C3, and C2+C4) from top to bottom. A user can adjust the projection positions by setting the direction and the amount of lens shift, for example, via the operation unit 213.

After the projection positions of the projectors 800A and 800B are adjusted to be shifted vertically by ½ a pixel, the projectors 800A and 800B start to project optical images based on the input image. In this manner, the projectors 800A and 800B can perform a projection operation as in the first embodiment. To perform a projection operation as in the second embodiment, the projection areas of the projectors 800A and 800B are adjusted to be shifted horizontally and vertically by a ¼ of a pixel each. In this case, a test pattern is designed to enable confirmation of the ¼-pixel shift.

In the present embodiment, static pixel shifting as applied by the image composition unit 286 in the foregoing embodiments is realized by shifting the projection positions of the two projectors. Accordingly, an effect similar to that of an above-described embodiment can be obtained by using a plurality of common projectors that only have one optical system. Also in the present embodiment, the direction of pixel shifting by the pixel shifting device 281 and the direction of pixel shifting by adjusting the projection position of the projectors are interchangeable.

Fourth Embodiment

Next, the fourth embodiment of the present invention is described. In the third embodiment, the projection positions of the projectors 800A and 800B are manually adjusted to match up horizontally and to be shifted vertically by ½ a pixel. However, the projection positions may be automatically adjusted by utilizing a captured image of the projection plane.

Figure 20:
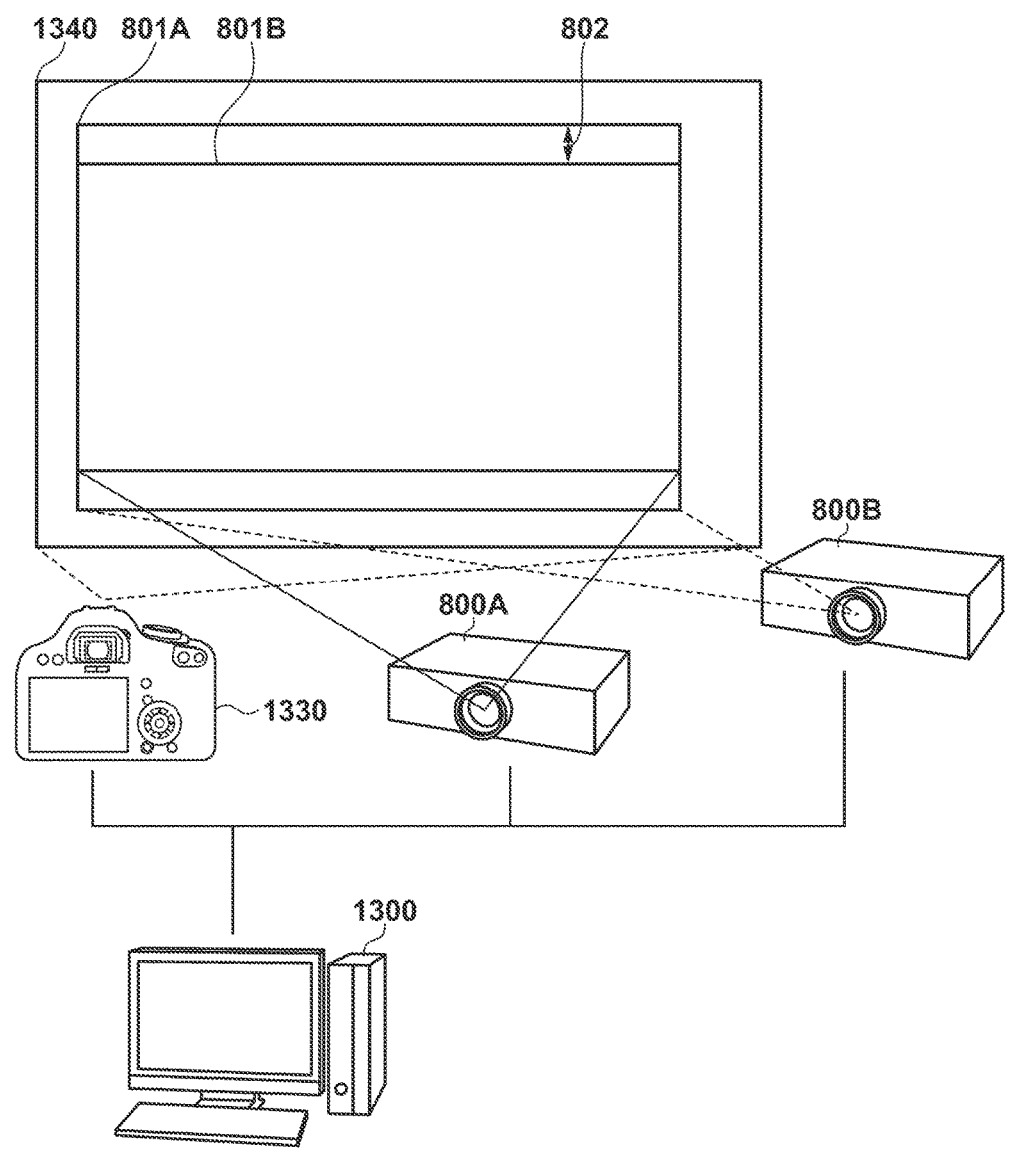
FIG. 20 is a schematic drawing of a projection system according to the fourth embodiment.

FIG. 20 is a schematic drawing of a projection system according to the present embodiment. The projection system includes projectors 800A and 800B, a PC 1300 as an information processing apparatus for adjusting the projection positions of the projectors 800A and 800B, and a digital camera 1330 which captures an image of the projection plane. The projectors 800A and 800B, the PC 1300, and the digital camera 1330 are connected to each other in a communicable manner.

Figure 21:
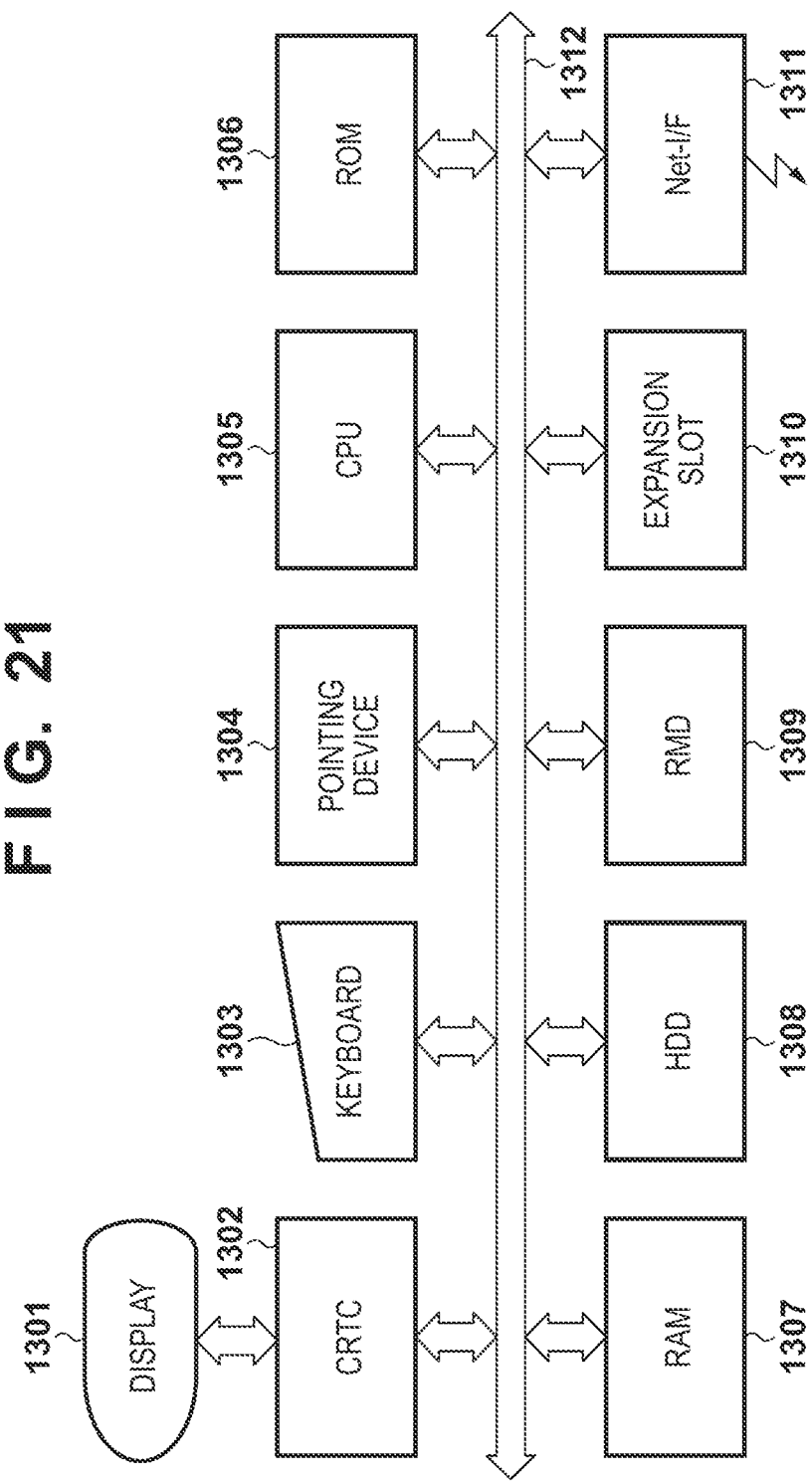
FIG. 21 is a block diagram showing an exemplary functional configuration of a PC in the fourth embodiment.

FIG. 21 is a block diagram showing an exemplary configuration of the PC 1300 in the present embodiment.

A display 1301 displays information regarding data processed by an application program, various message menus, etc., and is composed of an LCD or the like. A display controller 1302 controls screen display on the display 1301. A keyboard 1303 and a pointing device 1304 are used to enter characters and the like and to indicate icons or buttons in the GUI. The CPU 1305 controls the entire PC 1300.

A ROM 1306 stores programs, parameters, etc. to be executed by the CPU 1305. A RAM 1307 serves as a work area for executing various programs by the CPU 1305, a temporary save area during error handling, or for other like purposes.

A hard disk drive (HDD) 1308 and a removable media drive (RMD) 1309 serve as external storage. The removable media drive is a writing or reading apparatus for a removable recording medium, and may be a flexible disk drive, an optical disk drive, a magneto-optical disk drive, a memory card reader, or even a removable HDD.

Regarding the PC 1300 in the present embodiment, programs for performing various functions, operating systems, application programs (e.g., a browser), data, libraries, and the like are stored in one or more of (the recording media in) the ROM 1306, the HDD 1308, and the RMD 1309, depending on their intended use. In the present embodiment, the adjustment operation of the projection position and the remote control operation of the digital camera 1330 are implemented as, for example, functions of a projector control application.

An expansion slot 1310 is an expansion card insertion slot, for example, compliant with the PCI bus standard. Various expansion boards, such as a video capture board, a sound board, or a GPIB board, can be inserted into the expansion slot 1310.

A network interface (Net-I/F) 1311 has a wired communication function compliant with the USB standard, the IEEE 1394 standard, the LAN, etc. or a wireless communication function compliant with the IEEE 802.11a/b/g standard, the Bluetooth standard, etc. The PC 1300 in the present embodiment is configured to communicate with the projectors 800A and 800B as well as the digital camera 1330 via the network interface 1311. Buses 1312 include an address bus, a data bus, and a control bus, and interconnect the above-mentioned units.

The digital camera 1330 may be provided in the PC 1300 or in either of the projector 800A or 800B. When the CPU 1305 detects a start-up instruction of the projector control application, for example, via the pointing device 1304, the CPU 1305 reads out the application from the HDD 1308 or the like, stores the application in the RAM 1307, and starts to run the application. The CPU 1305 recognizes, for example, the projectors 800A and 800B and the digital camera 1330 connected to the network interface 1311. The digital camera 1330 is positioned such that its field of view 1340 covers the projection areas 801A and 801B of the projectors 800A and 800B. The projectors 800A and 800B are to be installed directly opposite to the projection plane and provide images in the same projection size.

Figure 22:
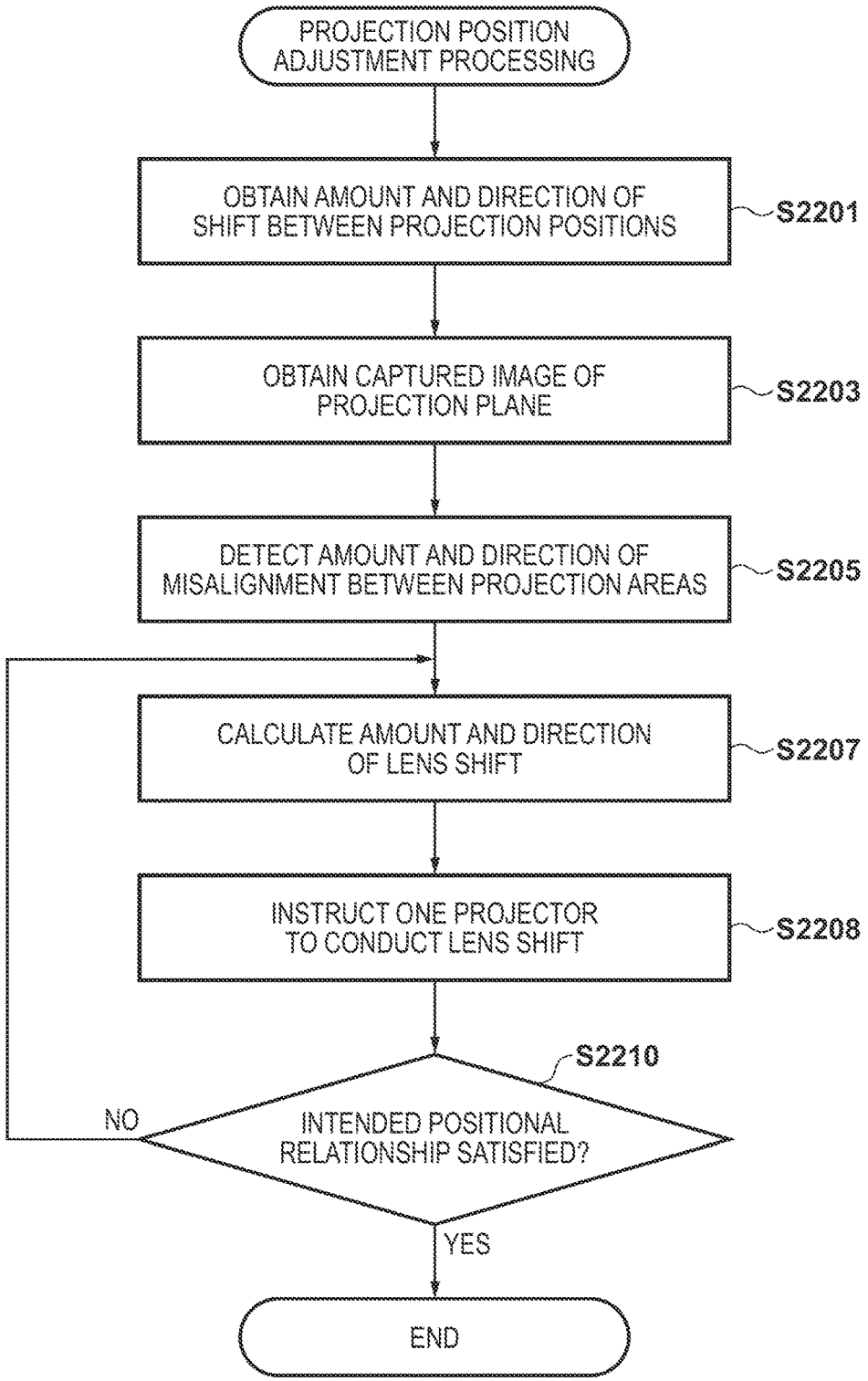
FIG. 22 is a flowchart of a projection position adjustment operation in the fourth embodiment.

The PC 1300 (the CPU 1305) performs automatic adjustment of the projection positions of the projectors 800A and 800B in the manner shown in the flowchart in FIG. 22.

Suppose a user enters an instruction to shift the projection position of the projector 800B vertically by ½ a pixel relative to the projection position of the projector 800A, for example, by making an operation on a menu (step S2201). The CPU 1305 sends an instruction to capture an image to the digital camera 1330 via the network interface 1311 (step S2203). In response to the instruction to capture an image, the digital camera 1330 captures an image and transmits a captured image to the PC 1300.

The CPU 1305 receives the captured image, detects the current projection areas 801A and 801B therefrom, and calculates the amount and the direction of misalignment between the projection areas (step S2205). For example, the CPU 1305 calculates the amount and the direction of misalignment at the upper right corners of rectangles constituting the projection areas 801A and 801B, and takes the calculated result as the amount and the direction of misalignment between the projection areas. To simplify the detection of the projection areas 801A and 801B from the captured image, the CPU 1305 may instruct the projectors 800A and 800B to project certain images before instructing the digital camera 1330 to capture an image.

After the CPU 1305 calculates the amount and the direction of current misalignment between the projection areas 801A and 801B, the CPU 1305 calculates the amount and the direction of lens shift for bringing the projection areas 801A and 801B into an intended positional relationship (step S2207). In the intended positional relationship according to this example, the projection area 801B is not shifted horizontally relative to the projection area 801A but is shifted relative to the projection area 801A vertically by +½ a pixel of the optical modulation device. In principle, lens shift is applied to either one of the projector 800A or the projector 800B. The relationship between the amount of lens shift and the pixel pitch of the optical modulation device in the projector is registered in the projector control application in association with the projector model. Upon recognition of the connection with the projectors 800A and 800B, the CPU 1305 acquires their model information and calculates the amount and the direction of lens shift suitable for the projector model.

The CPU 1305 specifies the calculated amount and direction of lens shift, and instructs the projector 800B to execute a lens shift operation (step S2208).

On receiving the lens shift execution instruction via the communication unit 214, the CPU 210 in the projector 800B shifts the optical axis of the projection optical system 283 in the specified amount and direction. The CPU 210 then notifies the PC 1300 that the lens shift operation is complete.

Upon receiving the notification from the projector 800B that the lens shift operation is complete, the CPU 1305 in the PC 1300 decides whether the projection areas 801A and 801B satisfy the intended positional relationship (step S2210). Specifically, the CPU 1305 performs, for example, processing similar to that in steps S2203 and S2205, and decides whether the calculated misalignment between the projection areas 801A and 801B satisfies the intended positional relationship. If the projection areas 801A and 801B satisfy the intended positional relationship, the CPU 1305 ends the process. Otherwise, the process returns to step S2207.

In this description, the projectors 800A and 800B are brought into the intended positional relationship by at least one lens shift operation. However, the projectors 800A and 800B may be gradually brought into the intended positional relationship through repetitive lens shift operations. For example, the CPU 1305 gives an instruction to repeat the lens shift operation by applying a first shift amount until the misalignment between the projectors 800A and 800B is reduced to less than a threshold value. When the misalignment derived from the projectors 800A and 800B is reduced to less than the threshold value, the CPU 1305 gives an instruction to continue the lens shift operation by applying a second shift amount, which is less than the first shift amount, until the amount of misalignment reaches an intended value. A single shift amount may be adjusted to three or more shift amount(s).

As described above, the present embodiment can automatically adjust the positions of the projection areas based on the captured image of the projection plane, in contrast to the third embodiment which manually adjusts the positions of the projection areas.

Other Embodiments

The third and fourth embodiments employ the projectors 800A and 800B which are independent of each other. Additionally, the projector 200 employed in the first and second embodiments may be configured to replace the image composition unit 286 with an additional projection optical system, thereby allowing the optical systems A and B to project optical images independently of each other. In this case, the projection positions of the two projection optical systems are adjusted in the manner described in the third and fourth embodiments, and static pixel shifting is applied on the projection plane.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-194561, filed on Oct. 4, 2017 which is hereby incorporated by reference herein in its entirety.

What is claimed is:

1. A projector comprising:
a first output unit configured to output a first optical image based on a frame inputted;
a first position control unit configured to control a position of the first optical image such that the first optical image in a second subframe period is shifted in a first direction by a first distance relative to the first optical image in a first subframe period, a frame period of the frame including the first subframe period and the second subframe period;
a second output unit configured to generate a second optical image based on the frame;
a second position control unit configured to control a position of the second optical image such that the second optical image in the second subframe period is shifted in the first direction by the first distance relative to the second optical image in the first subframe period; and
a projection unit configured to composite the first optical image and the second optical image such that the second optical image is shifted in a second direction different from the first direction by a second distance relative to the first optical image, and to project the composite optical image onto a projection plane.

2. The projector according to claim 1,
wherein the first direction is either a horizontal direction or a vertical direction, and the second direction is the other one of the horizontal direction and the vertical direction, and
the first distance and the second distance are half of a pixel pitch in the optical image.

3. The projector according to claim 1,
wherein the first direction is a diagonal 45-degree direction, and the second direction is a horizontal direction or a vertical direction, and
the first distance and the second distance are half of pixel pitch in the optical image.

4. The projector according to claim 1,
wherein each of the first direction and the second direction is a diagonal 45-degree direction, and
the first distance is either half or a quarter of a pixel pitch in the optical image, and the second distance is the other of the half or the quarter of the pixel pitch in the optical image.

5. The projector according to claim 1,
wherein the first position control unit includes a first optical member configured to refract an optical path of the first optical image, and
the second position control unit includes a second optical member configured to refract an optical path of the second optical image.

6. The projector according to claim 5,
wherein the first position control unit drives the first optical member such that the optical path of the first optical member has different refractive indexes in the first subframe period and in the second subframe period.

7. The projector according to claim 1,
wherein the projection unit optically composites the first optical image and the second optical image such that the second optical image is shifted in the second direction by the second distance relative to the first optical image, and projects the composite optical image in the shifted state.

8. The projector according to claim 1,
wherein the projection unit includes a plurality of projection optical systems configured to project the first optical image and the second optical image independently.

9. A projection system which comprises:
a first projector comprising a first output unit configured to output a first optical image based on an input frame, and a first position control unit configured to control a position of the first optical image such that the first optical image in a second subframe period is shifted in a first direction by a first distance relative to the first optical image in a first subframe period, a frame period of the frame including the first subframe period and the second subframe period; and
a second projector comprising a second output unit configured to generate a second optical image based on the frame, and a second position control unit configured to control a position of the second optical image such that the second optical image in the second subframe period is shifted in the first direction by the first distance relative to the second optical image in the first subframe period,
wherein the first projector and the second projector are adjusted to project the second optical image in a shifted state where the second optical image is shifted in a second direction different from the first direction by a second distance relative to the first optical image.

10. A method for controlling a projector comprising:
outputting a first optical image based on a frame inputted;
controlling a position of the first optical image such that the first optical image in a second subframe period is shifted in a first direction by a first distance relative to the first optical image in a first subframe period, a frame period of the frame including the first subframe period and the second subframe period;
generating a second optical image based on the frame;
controlling a position of the second optical image such that the second optical image in the second subframe period is shifted in the first direction by the first distance relative to the second optical image in the first subframe period;
compositing the first optical image and the second optical image such that the second optical image is shifted in a second direction different from the first direction by a second distance relative to the first optical image; and
projecting the composite optical image onto a projection plane.

11. The method according to claim 10,
wherein the first direction is either a horizontal direction or a vertical direction, and the second direction is the other one of the horizontal direction and the vertical direction, and
the first distance and the second distance are half of a pixel pitch in the optical image.

12. The method according to claim 10,
wherein the first direction is a diagonal 45-degree direction, and the second direction is a horizontal direction or a vertical direction, and
the first distance and the second distance are half of pixel pitch in the optical image.

13. The method according to claim 10,
wherein each of the first direction and the second direction is a diagonal 45-degree direction, and
the first distance is either half or a quarter of a pixel pitch in the optical image, and the second distance is the other of the half or the quarter of the pixel pitch in the optical image.

14. The method according to claim 10, wherein
the controlling a position of the first optical image uses a first optical member being configured to refract an optical path of the first optical image, and
the controlling a position of the second optical image uses a second optical member being configured to refract an optical path of the second optical image.

15. The method according to claim 14,
wherein the controlling a position of the first optical image comprises driving the first optical member such that the optical path of the first optical member has different refractive indexes in the first subframe period and in the second subframe period.

16. The method according to claim 10, wherein
the compositing optically composites the first optical image and the second optical image such that the second optical image is shifted in the second direction by the second distance relative to the first optical image, and the projecting projects the composite optical image in the shifted state.

17. The method according to claim 10,
wherein the projecting projects the first optical image and the second optical image independently through a plurality of projection optical systems.

18. A control method of a projection system, wherein the projection system comprises:
a first projector comprising a first output unit configured to output a first optical image based on an input frame, and a first position control unit configured to control a position of the first optical image such that the first optical image in a second subframe period is shifted in a first direction by a first distance relative to the first optical image in a first subframe period, a frame period of the frame including the first subframe period and the second subframe period; and
a second projector comprising a second output unit configured to generate a second optical image based on the frame, and a second position control unit configured to control a position of the second optical image such that the second optical image in the second subframe period is shifted in the first direction by the first distance relative to the second optical image in the first subframe period,
wherein the control method comprises
adjusting the first projector and the second projector to project the second optical image in a shifted state where the second optical image is shifted in a second direction different from the first direction by a second distance relative to the first optical image.

19. A non-transitory computer-readable medium storing a program executable by a processor included in a projector, wherein the program, when executed by the processor, causes the projector to function as:
a first output unit configured to output a first optical image based on a frame inputted;
a first position control unit configured to control a position of the first optical image such that the first optical image in a second subframe period is shifted in a first direction by a first distance relative to the first optical image in a first subframe period, a frame period of the frame including the first subframe period and the second subframe period;
a second output unit configured to generate a second optical image based on the frame;
a second position control unit configured to control a position of the second optical image such that the second optical image in the second subframe period is shifted in the first direction by the first distance relative to the second optical image in the first subframe period; and
a projection unit configured to composite the first optical image and the second optical image such that the second optical image is shifted in a second direction different from the first direction by a second distance relative to the first optical image, and to project the composite optical image onto a projection plane.

* * * * *